(12) United States Patent
Basso

(10) Patent No.: US 10,482,539 B2
(45) Date of Patent: Nov. 19, 2019

(54) METHODS AND SYSTEMS FOR PRECISION CROP MANAGEMENT

(71) Applicant: BOARD OF TRUSTEES OF MICHIGAN STATE UNIVERSITY, East Lansing, MI (US)

(72) Inventor: Bruno Basso, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 15/612,442

(22) Filed: Jun. 2, 2017

(65) Prior Publication Data

US 2017/0270616 A1 Sep. 21, 2017

Related U.S. Application Data

(63) Continuation of application No. PCT/US2015/063910, filed on Dec. 4, 2015.
(Continued)

(51) Int. Cl.
*G06F 17/50* (2006.01)
*G06Q 40/08* (2012.01)
(Continued)

(52) U.S. Cl.
CPC ........... *G06Q 40/08* (2013.01); *A01B 79/005* (2013.01); *G06F 17/5009* (2013.01); *G06Q 10/06313* (2013.01); *G06Q 10/06314* (2013.01)

(58) Field of Classification Search
CPC ............... G06Q 40/08; G06Q 10/6313; G06Q 10/06314; G06Q 10/06313; A01B 79/005; G06F 17/5009
See application file for complete search history.

(56) References Cited

U.S. PATENT DOCUMENTS

2001/0016053 A1* 8/2001 Dickson ............... G01J 3/2803
382/110
2003/0018431 A1 1/2003 Hanson
(Continued)

FOREIGN PATENT DOCUMENTS

CA 2 663 917 A1 10/2010

OTHER PUBLICATIONS

Basso, B., et al., "Spatial Validation of Crop Models for Precision Agriculture," *Agricultural Systems*, 68:97-112 (2001).
(Continued)

*Primary Examiner* — Dwin M Craig
(74) *Attorney, Agent, or Firm* — Marshall, Gerstein & Borun LLP

(57) ABSTRACT

The disclosure relates to methods and related systems for precision crop modeling and management using the same. Precision crop modeling and management can be incorporated into various methods for growing plants such as crop plants and various methods for managing the growth of such plants in a particular field. The methods generally utilize in-season information relating to weather conditions actually experienced by the field to prepare mid-season, updated crop management plans. A crop management plan is determined using a crop model incorporating a variety of inputs and plant-specific material and energy balances to specify one or more grower-controlled management parameters. An updated plan for a given field can be followed by a grower to increase crop yield and/or optimize one or more other crop or field parameters.

31 Claims, 11 Drawing Sheets

Related U.S. Application Data

(60) Provisional application No. 62/087,924, filed on Dec. 5, 2014.

(51) Int. Cl.
*A01B 79/00* (2006.01)
*G06Q 10/06* (2012.01)

(56) References Cited

U.S. PATENT DOCUMENTS

| | | | |
|---|---|---|---|
| 2006/0015374 A1* | 1/2006 | Ochs | G06Q 40/00 705/4 |
| 2006/0287896 A1 | 12/2006 | McComb et al. | |
| 2007/0255502 A1* | 11/2007 | Pruett | A01L 379/005 702/19 |
| 2012/0109614 A1 | 5/2012 | Lindores | |
| 2013/0174040 A1 | 7/2013 | Johnson | |
| 2013/0198693 A1* | 8/2013 | Jost | G06F 3/04815 715/848 |
| 2014/0358486 A1 | 12/2014 | Osborne | |

OTHER PUBLICATIONS

Batchelor, William D., et al., "Examples of Strategies to Analyze Spatial and Temporal Yield Variability Using Crop Models," *Europ. J. Agronomy*, 18:141-58 (2002).
Jones, J.W., et al., "The DSSAT Cropping System Model," *Europ. J. Agronomy*, 18:235-65 (2003).
Basso, B., et al., "Analyzing the Effects of Climate Variability on Spatial Pattern of Yield in a Maize-Wheat-Soybean Rotation," *Europ. J. Agronomy*, 26:82-91 (2007).
Ritchie, J.T., et al., "Water Use Efficiency is Not Constant When Crop Water Supply is Adequate or Fixed: The Role of Agronomic Management," *Europ. J. Agronomy*, 28:273-81 (2008).
Basso, B., et al., "Landscape Position and Precipitation Effects on Spatial Variability of Wheat Yield and Grain Protein in Southern Italy," *J. Agronomy & Crop Science*, 195:301-12 (2009).
Basso, B., et al., "Long-Term Wheat Response to Nitrogen in a Rainfed Mediterranean Environment: Field Data and Simulation Analysis," *Europ. J. Agronomy*, 33:132-38 (2010).
Filimon E., "Weather to Buy or Sell Extreme Weather Impact on Corn Futures Market," Mater Thesis, pp. 1-74 (2011).
Cammarano, D., et al., "Use of the Canopy Chlorophyl Content Index (CCCI) for Remote Estimation of Wheat Nitrogen Content in Rainfed Environments," *Agronomy Journal*, 103(6):1597-1603 (2011).
Basso, B., et al., "A Strategic and Tactical Management Approach to Select Optimal N Fertilizer Rates for Wheat in a Spatially Variable Field ," *Europ. J. Agronomy*, 35:215-22 (2011).
Basso, B., et al., "Economic and Environmental Evaluation of Site-Specific Tillage in a Maize Crop in NE Italy," *Europ. J. Agronomy*, 35:83-92 (2011).
Basso, B., et al., "Environmental and Economic Evaluation of N Fertilizer Rates in a Maize Crop in Italy: A Spatial and Temporal Analysis Using Crop Models," *Biosystems Engineering*, 113:103-11 (2012).
Cammarano, D., et al., "Assessing the Robustness of Vegetation Indices to Estimate Wheat N in Mediterranean Environments," *Remote Sens.*, 6:2827-44 (2014).
Basso, B., et al., "Assessing the Impact of Management Strategies on Water Use Efficiency Using Soil-Plant-Atmosphere Models," *Vadose Zone J.*, available from www.VadoseZoneJournal.org (2012).
International Search Report and Written Opinion of the International Searching Authority in counterpart International Application No. PCT/US2015/063910, dated Feb. 5, 2016 (17 pages).

\* cited by examiner

Profit Zones: 2012
Avg: $194/acre

Net Profit (dollars/acre)
- HIGH: $740
- LOW: $148

0 — 0.2 MILES

Profit Zones: 2012 (CMP #1)
Avg: $428/acres

2012, ONLY 30 # N/ac

Net Profit (dollars/hectare)
- -$400 to -$300
- -$300 to -$200
- -$200 to -$100
- -$100 to $0
- $0 to -$200
- $200 to -$400
- $400 to -$600
- $600 to -$800
- $800 to -$1000
- $1000 to -$1200
- $1200 to -$1400
- > $1400

0 — 0.1 MILES

METHODS AND SYSTEMS FOR PRECISION CROP MANAGEMENT

CROSS-REFERENCE TO RELATED APPLICATIONS

This application is a continuation of International Patent Application No. PCT/US2015/063910 designating the United States and filed Dec. 4, 2015, which claims the priority benefit of U.S. Provisional Application No. 62/087,924 (filed on Dec. 5, 2014), both of which are incorporated herein by reference in its entirety.

STATEMENT OF GOVERNMENT INTEREST

None.

BACKGROUND OF THE DISCLOSURE

Field of the Disclosure

The disclosure relates to methods and related systems for precision crop modeling and crop management using the same. The disclosure further relates to methods for growing plants, such as crop plants. The disclosure further relates to methods for managing the growth of such plants in a particular field.

SUMMARY

The disclosure relates to methods and related systems for precision crop modeling and management using the same. Precision crop modeling and management can be incorporated into various methods for growing plants (e.g., crop plants or otherwise) and various methods for managing the growth of such plants in a particular field. The methods generally utilize in-season information relating to weather conditions actually experienced by the field to prepare mid-season, updated crop management plans. A crop management plan is determined using a crop model incorporating a variety of inputs and plant-specific material and energy balances to specify one or more grower-controlled management parameters. An updated plan for a given field (e.g., reflecting an updated prescription for fertilization, irrigation, and/or other grower-controlled management parameters) can be followed by a grower to increase crop yield and/or optimize one or more other crop or field parameters (e.g., crop quality, field (marginal) net return, etc.). Re-evaluating and updating the crop management plan at least once during the growing season with actual, in-season weather substantially increases the accuracy of the crop model, resulting in a updated crop management plan (e.g., which typically differs from the original crop management plan in at least one respect) that can be followed for the remainder of the growing season to yet further increase crop yield or improve an end-of-season crop or field parameter. Alternatively or additionally, the in-season information relating to actual weather conditions can be used in connection with a crop model to predict the end-of-season crop yield (or other crop or field parameters), which can be used to take action related to same, for example including buying or selling crop-related instruments such as insurance, futures, etc.

In one aspect, the disclosure relates to a method for growing a crop plant, the method including: (a) receiving an (initial) crop management plan for a field provided by a crop model; (b) planting a crop plant at an initial time ($t_o$) in the field according to the crop management plan; (c) growing the crop plant until an intermediate time ($t_i$) between the initial time ($t_o$) and a planned final time ($t_f$) for harvesting the crop plant; (d) receiving an updated crop management plan for the field provided by a crop model using (i) actual weather data for the field between the initial time ($t_o$) and the intermediate time ($t_i$), and (ii) projected weather data for the field between the intermediate time ($t_i$) and the planned final time ($t_f$); (e) growing the crop plant after the intermediate time ($t_i$) according to the updated crop management plan; and (f) harvesting the crop plant at about the planned final time ($t_f$).

In another aspect, the disclosure relates to a method for growing a crop plant, the method including: (a) receiving an (initial) crop management plan for a field provided by a crop model; (b) planting a crop plant at an initial time ($t_o$) in the field according to the crop management plan; (c) growing the crop plant until an intermediate time ($t_i$) between the initial time ($t_o$) and a planned final time ($t_f$) for harvesting the crop plant; (d) receiving a predicted crop yield for the field provided by a crop model using (i) actual weather data for the field between the initial time ($t_o$) and the intermediate time ($t_i$), and (ii) projected weather data for the field between the intermediate time ($t_i$) and the planned final time ($t_f$); (e) performing at least one of purchasing futures, selling futures, and purchasing insurance for the crop plant based on the predicted crop yield; and (f) harvesting the crop plant at about the planned final time ($t_f$).

In another aspect, the disclosure relates to a method for managing the growth of a crop plant, the method including: (a) receiving historical data for a field, the historical data including historical weather data; (b) determining an (initial) crop management plan for a crop plant in the field using a crop model and the field historical data, the crop management plan including a planned initial time ($t_o$) for planting the crop plant and a planned final time ($t_f$) for harvesting the crop plant; (c) providing the crop management plan directly or indirectly to a grower; (d) receiving actual weather data for the field up to an intermediate time ($t_i$) between the initial time ($t_o$) and the final time ($t_f$); (e) determining an updated crop management plan for the field using a crop model using (i) the actual weather data for the field between the initial time ($t_o$) and the intermediate time ($t_i$), and (ii) projected weather data for the field between the intermediate time ($t_i$) and the planned final time ($t_f$); and (f) providing the updated crop management plan directly or indirectly to the grower. In a refinement, part (d) further includes receiving actual crop management data for the field up to an intermediate time ($t_i$) between the initial time ($t_o$) and the final time ($t_f$); and in part (e), the crop model additionally uses the actual crop management data to determine the updated crop management plan. In another refinement, part (d) further includes receiving remotely sensed crop plant nitrogen data for the field between the initial time ($t_o$) and the intermediate time ($t_i$); and in part (e), the crop model additionally uses the remotely sensed crop plant nitrogen data to determine the updated crop management plan. In another refinement, the method further includes (g) receiving from the grower actual yield for the crop plant after harvest; and optionally (h) evaluating one or more compliance parameters for the crop plant using the crop model, the actual yield for the crop plant, and the actual weather for the growing season. In a related aspect, the disclosure relates to a computer storage medium including computer-readable instructions adapted to perform the foregoing crop plant growth management method. In another related aspect, the disclosure relates to a crop growth management system including: a computer including the foregoing computer storage medium, and a processor operatively coupled to the computer storage medium and adapted to execute the instructions on the computer storage medium to perform the crop plant growth management method.

In another aspect, the disclosure relates to a method for growing a crop plant, the method including: (a) receiving historical data for a field, the historical data including historical weather data; (b) determining an (initial) crop management plan for a crop plant in the field using a crop model and the field historical data, the crop management plan including a planned initial time ($t_o$) for planting the crop plant and a planned final time ($t_f$) for harvesting the crop plant; (c) planting a crop plant at about the initial time ($t_o$) in the field according to the crop management plan; (d) growing the crop plant until an intermediate time ($t_i$) between the initial time ($t_o$) and a planned final time ($t_f$) for harvesting the crop plant; (e) receiving actual weather data for the field up to the intermediate time ($t_i$) between the initial time ($t_o$) and the final time ($t_f$); (f) determining an updated crop management plan for the field using a crop model using (i) the actual weather data for the field between the initial time ($t_o$) and the intermediate time ($t_i$), and (ii) projected weather data for the field between the intermediate time ($t_i$) and the planned final time ($t_f$); (g) growing the crop plant after the intermediate time ($t_i$) according to the updated crop management plan; and (g) harvesting the crop plant at about the planned final time ($t_f$).

In another aspect, the disclosure relates to a method for managing the growth of a crop plant, the method including: (a) receiving historical data for a field, the historical data including historical weather data; (b) receiving an (initial) crop management plan for a crop plant in the field, the crop management plan including a planned initial time ($t_o$) for planting the crop plant and a planned final time ($t_f$) for harvesting the crop plant; (c) determining at the initial time ($t_o$) a predicted yield for the crop plant using a crop model, the field historical data, and the crop management plan; (d) receiving actual weather data for the field up to an intermediate time ($t_i$) between the initial time ($t_o$) and the final time ($t_f$); (e) determining at the intermediate time ($t_i$) an updated predicted yield for the crop plant using a crop model, the actual weather data for the field between the initial time ($t_o$) and the intermediate time ($t_i$), projected weather data for the field between the intermediate time ($t_i$) and the planned final time ($t_f$), and the crop management plan; and (f) selling crop insurance for the crop plant in the field according to an insurance parameter determined using at least one of the predicted yield and the updated predicted yield. In a related aspect, the disclosure relates to a computer storage medium including computer-readable instructions adapted to perform the foregoing crop plant growth management method. In another related aspect, the disclosure relates to a crop growth management system including: a computer including the foregoing computer storage medium, and a processor operatively coupled to the computer storage medium and adapted to execute the instructions on the computer storage medium to perform the crop plant growth management method.

In another aspect, the disclosure relates to a method for managing the growth of a crop plant, the method including: (a) receiving historical data for a plurality of fields in a region, the historical data including historical weather data; (b) receiving an (initial) crop management plan for a crop plant in each of the plurality of fields, the crop management plan including a planned initial time ($t_o$) for planting the crop plant and a planned final time ($t_f$) for harvesting the crop plant in each field; (c) determining at the initial time ($t_o$) a predicted yield for the crop plant using a crop model, the field historical data, and the crop management plan for each of the plurality of fields; (d) receiving actual weather data for each of the plurality of fields up to an intermediate time ($t_i$) between the initial time ($t_o$) and the final time ($t_f$); (e) determining at the intermediate time ($t_i$) an updated predicted yield for the crop plant using a crop model, the actual weather data for the field between the initial time ($t_o$) and the intermediate time ($t_i$), projected weather data for the field between the intermediate time ($t_i$) and the planned final time ($t_f$), and the crop management plan for each of the plurality of fields; (f) purchasing or selling futures for the crop plant according to the updated projected yield for the crop plant in the region. In a related aspect, the disclosure relates to a computer storage medium including computer-readable instructions adapted to perform the foregoing crop plant growth management method. In another related aspect, the disclosure relates to a crop growth management system including: a computer including the foregoing computer storage medium, and a processor operatively coupled to the computer storage medium and adapted to execute the instructions on the computer storage medium to perform the crop plant growth management method.

Various refinements of the foregoing aspects are possible. For example, the crop plant can be selected from the group consisting of corn, wheat, soybean, cultivars thereof, and combinations thereof. In another refinement, the crop management plan is provided by the crop model using historical data for the field, for example including historical weather data for the field and/or historical yield data for the field. In various embodiments, the actual weather data (e.g., historical weather prior to the growing season, actual weather in-season) and the projected weather data include one or more of incident solar radiation, maximum and minimum temperature, and rainfall. In a further refinement, the projected weather data is selected from the group consisting of forecast data for the field, probabilistic weather data based on historical weather data for the field, and combinations thereof.

In another refinement, growing the crop plant until an intermediate time ($t_i$) (e.g., between the initial time ($t_o$) and the planned final time ($t_f$)) includes growing the crop plant according to the (initial) crop management plan. In another refinement, growing the crop plant after the intermediate time ($t_i$) includes growing the crop plant according to the updated crop management plan until a new updated crop management plan is received at a new intermediate time ($t_i^{NEW}$) or the crop plant is harvested. In another refinement, the method includes (i) growing the crop plant until a specified time (e.g., the intermediate time) according to an (initial) crop management plan, (ii) receiving an updated crop management plan for the field provided by a crop model using, and (iii) growing the crop plant after the specified time (e.g., the intermediate) according to the updated crop management plan repeatedly to provide a plurality of updated crop management plans at a plurality of specified times (e.g., plurality of intermediate times ($t_i^{(j)}$)).

In another refinement, the updated crop management plan is provided by the crop model additionally using the actual crop management plan performed (e.g., actual crop management activities performed) for the field between the initial time ($t_o$) and the intermediate time ($t_i$). In another refinement, the updated crop management plan is provided by the crop model additionally using remotely sensed crop plant nitrogen data for the field between the initial time ($t_o$) and the intermediate time ($t_i$).

In another refinement, the (initial) crop management plan for the field provided by the crop model optimizes one or more of crop plant yield, crop plant quality, crop plant marginal net return, soil organic content, and environmental pollutant generation; and/or the updated crop management plan for the field provided by the crop model optimizes one or more of crop plant yield, crop plant marginal net return, soil organic content, and environmental pollutant generation.

In another refinement, the (initial) crop management plan includes one or more of crop plant species, crop plant cultivar, tilling plan, pest management schedule, pest management chemicals, irrigation amount, irrigation schedule, fertilization amount, fertilization type, fertilization schedule, planting time, and harvest time; and/or the updated crop management plan includes one or more of pest management schedule, pest management chemicals, irrigation amount, irrigation schedule, fertilization amount, fertilization type, fertilization schedule, and harvest time.

In another refinement, the (initial) crop management plan is spatially variable for the field, and/or the updated crop management plan is spatially variable for the field.

In another refinement, at least one crop management item is different in the updated crop management plan relative to the corresponding crop management item from the (initial) crop management plan. In another refinement, (i) the (initial) crop management plan includes at least one of a fertilization amount, a fertilization type, a fertilization location, and a fertilization schedule; and (ii) the updated crop management plan includes at least one of an updated fertilization amount, an updated fertilization type, an updated fertilization location, and, an updated fertilization schedule relative to the (initial) crop management plan. In another refinement, (i) the (initial) crop management plan includes at least one of an irrigation amount and an irrigation schedule; and (ii) the updated crop management plan in part (d) includes at least one of an updated irrigation amount and an updated irrigation schedule relative to the (initial) crop management plan.

While the disclosed methods and systems are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

The disclosure relates to methods and related systems for precision crop modeling and management using the same. Precision crop modeling and management can be incorporated into various methods for growing plants (e.g., crop plants or otherwise) and various methods for managing the growth of such plants in a particular field. The methods generally utilize in-season information relating to weather conditions actually experienced by the field to prepare mid-season, updated crop management plans. A crop management plan is determined using a crop model incorporating a variety of inputs and plant-specific material and energy balances to specify one or more grower-controlled management parameters. An updated plan for a given field (e.g., reflecting an updated prescription for fertilization, irrigation, and/or other grower-controlled management parameters) can be followed by a grower to increase crop yield and/or optimize one or more other crop or field parameters (e.g., crop quality, field (marginal) net return, etc.). Alternatively or additionally, the in-season information relating to actual weather conditions can be used in connection with a crop model to predict the end-of-season crop yield (or other crop or field parameters), which can be used to take action related to same, for example including buying or selling crop-related instruments such as insurance, futures, etc.

Process Overview

Figure 1:
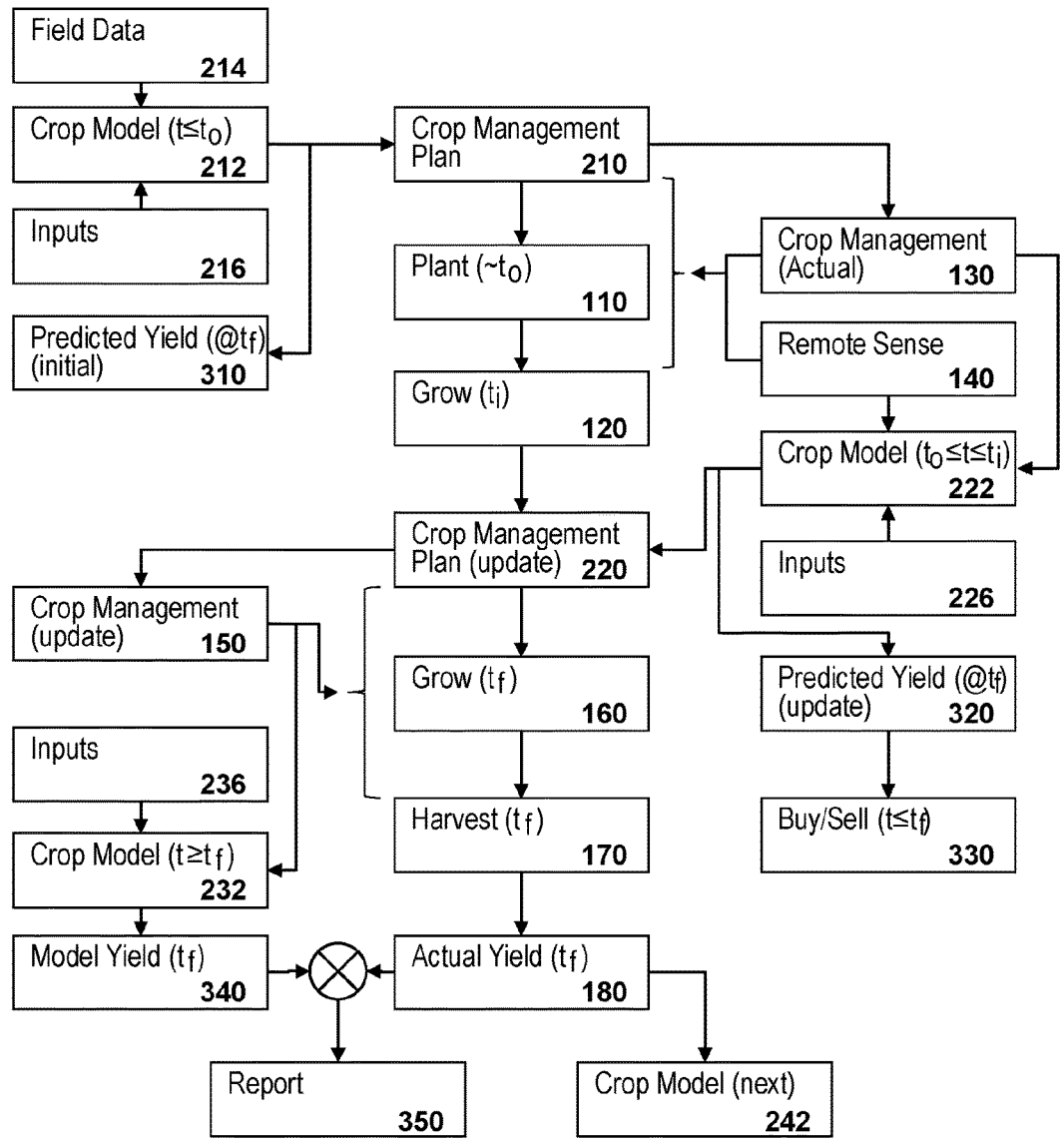
FIG. 1 is a process flow diagram illustrating methods according to the disclosure incorporating precision crop modeling, for example as related to particular methods for growing crop plants and/or managing the growth of crop plants.

FIG. 1 is a process flow diagram illustrating methods according to the disclosure incorporating precision crop modeling, for example as related to particular methods for growing crop plants and/or managing the growth of crop plants. FIG. 1 illustrates various steps of an overall planting and growing cycle which incorporates one or more crop modeling steps and incorporates in-season actual weather conditions experienced at a particular field to update crop management strategies and improve one or more crop or field productivity parameters. In various embodiments, a subset of steps from the overall process flow diagram is performed, for example as relating to activity of a given actor in the overall process (e.g., small-, mid-, or large-scale growers, crop modeling service providers, crop insurance providers, crop commodities brokers, etc.).

As illustrated in FIG. 1, an overall planting and growing cycle can begin with determination of a crop management plan 210 prior to planting (e.g., at an initial or planting time $t_o$) using a crop model 212 (e.g., computed at some pre-planting time $t \leq t_o$). Crop models are generally known in the art and are described in more detail below. Generally, a crop model incorporates a variety of plant-, weather-, and field-specific inputs, material balances, and energy balances to compute future plant growth over a period of time (e.g., at multiple points in time spanning a single or multiple growing seasons). The crop model 212 utilizes historical field data 214 (e.g., weather data, yield data, etc.) along with other inputs 216 to compute future plant growth and field state properties, and to determine the crop management plan 210.

The historical field data 214 can include one or both of historical weather data and historical yield data for the field being modeled to which the crop management plan 210 applies. The historical weather data and historical yield data can be used to initialize the crop model 212, for example before determining the initial crop management plan 210, initial predicted yield 310, etc. for the forthcoming growing season. Initialization of the crop model 212 for a given field ensures that the field state properties (e.g., soil physical properties, soil chemical constituents and soil thermal characteristics, as described below, such as a function of location or constant across the field, depending on the particular property) determined as representing the field at a time prior to planting are as accurate as possible. Accurate, pre-planting initial field state properties increase the ability of the crop model 212 to provide an accurate initial predicted yield 310 and an initial crop management plan 210 which is more likely to optimize one or more crop or field parameters at harvest (e.g., yield or otherwise).

Weather data can include (i) incident solar radiation, (ii) maximum and minimum temperature, and/or (iii) rainfall (or precipitation). In many embodiments, all three weather quantities are used and they are provided on a daily basis or in daily increments (e.g., daily incident solar radiation, daily maximum temperature and daily minimum temperature; and daily rainfall). Other weather data and/or timescales may be used as appropriate depending on the available data and the crop model used. For example, for crop models using computational timescales of other than one day, solar radiation, temperature, and rainfall profiles as a function of time (e.g., values measured at time intervals less than one day) may be used in addition to or as an alternative to the daily integral or maximum/minimum values.

Historical weather data can represent any weather data quantity for any period of time prior to the current growing season. For example, the period can represent at least 1, 2, 3, 4, 5, 7, 10, 20, or 30 years and/or up to 2, 4, 6, 8, 10, 20, 30, 40, or 50 years of historical weather data. Suitably, the historical data spans the period immediately prior to the current growing season and extends backward over a continuous time span. However, any timeframe can be used based on data availability (e.g., a discontinuous time span can be used when historical data is unavailable for some reason). The weather dataset for the field can be derived from meteorological data taken in the vicinity of the field, such as within 1, 2, 5, 10, 20, 50, or 100 km of the field. For example, a meteorological data station can be located on site at the field being modeled. In other embodiments, the meteorological data station gathering and reporting weather data could be up to about 100 km away from the field being modeled and still be reasonably representative of the historical weather data actually experienced by the field.

The historical yield data for the field includes data from the actual field being modeled. Similarly to the historical weather data, the historical yield data can represent at least 1, 2, 3, 4, 5, 7, 10, 20, or 30 years and/or up to 2, 4, 6, 8, 10, 20, 30, 40, or 50 years of historical yield data (e.g., the same timeframe as that for the historical weather data used). Suitably, the historical data spans the period immediately prior to the current growing season and extends backward over a continuous time span. However, any timeframe can be used based on data availability (e.g., a discontinuous time span can be used when historical data is unavailable for some reason). For example, complete historical weather data might be available for an entire selected historical period, but corresponding yield data might be available for only a portion of the selected historical period. In such case, the crop model, in combination with complete historical weather information and partial historical yield information can be used to simulate the missing yield periods (e.g., with knowledge of what plant was planted during the missing yield periods).

The historical yield data can be based on the same crop plant/cultivar to be planted during the upcoming growing season, it can be based on a different crop plant/cultivar, or it can be based on a combination of different crop plants/cultivars (e.g., where one plant or cultivar is the same as that to be planted). The historical weather and yield data is used to (i) initialize crop model parameters which are crop-independent (e.g., soil parameters) and (ii) identify relative stability and/or productivity zones which may be loosely crop-dependent or crop-independent, so different historical plants/cultivars are suitable for the historical yield data. For example, yield and/or stability zone boundaries within a field can be determined based on one crop and then applied to different crops being modeled (e.g., identify zones using historical corn yield data and then use the crop model going forward to model a wheat crop). In a preferred approach, however, yield and/or stability zone boundaries within a field are determined based on the crop of interest to be planted in the upcoming growing season.

Figure 2A:
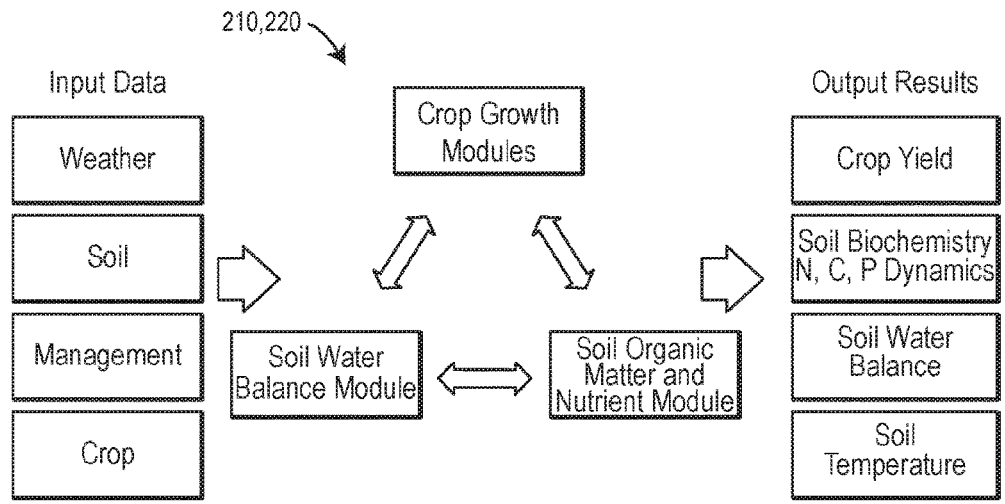
FIGS. 2A, 2B, and 2C are flow diagrams illustrating inputs and outputs to crop models according to the disclosure including, for example, yield map and updated weather input according to the disclosure, such as for use in the general processes illustrated in FIGS. 1 and 1A-1E.
Figure 2B:
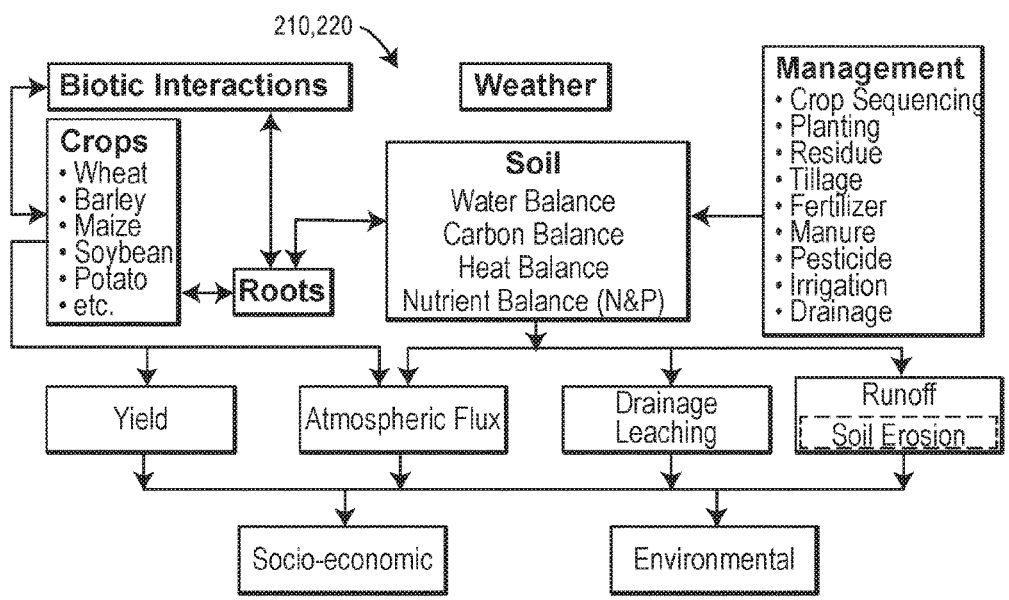
Figure 2C:
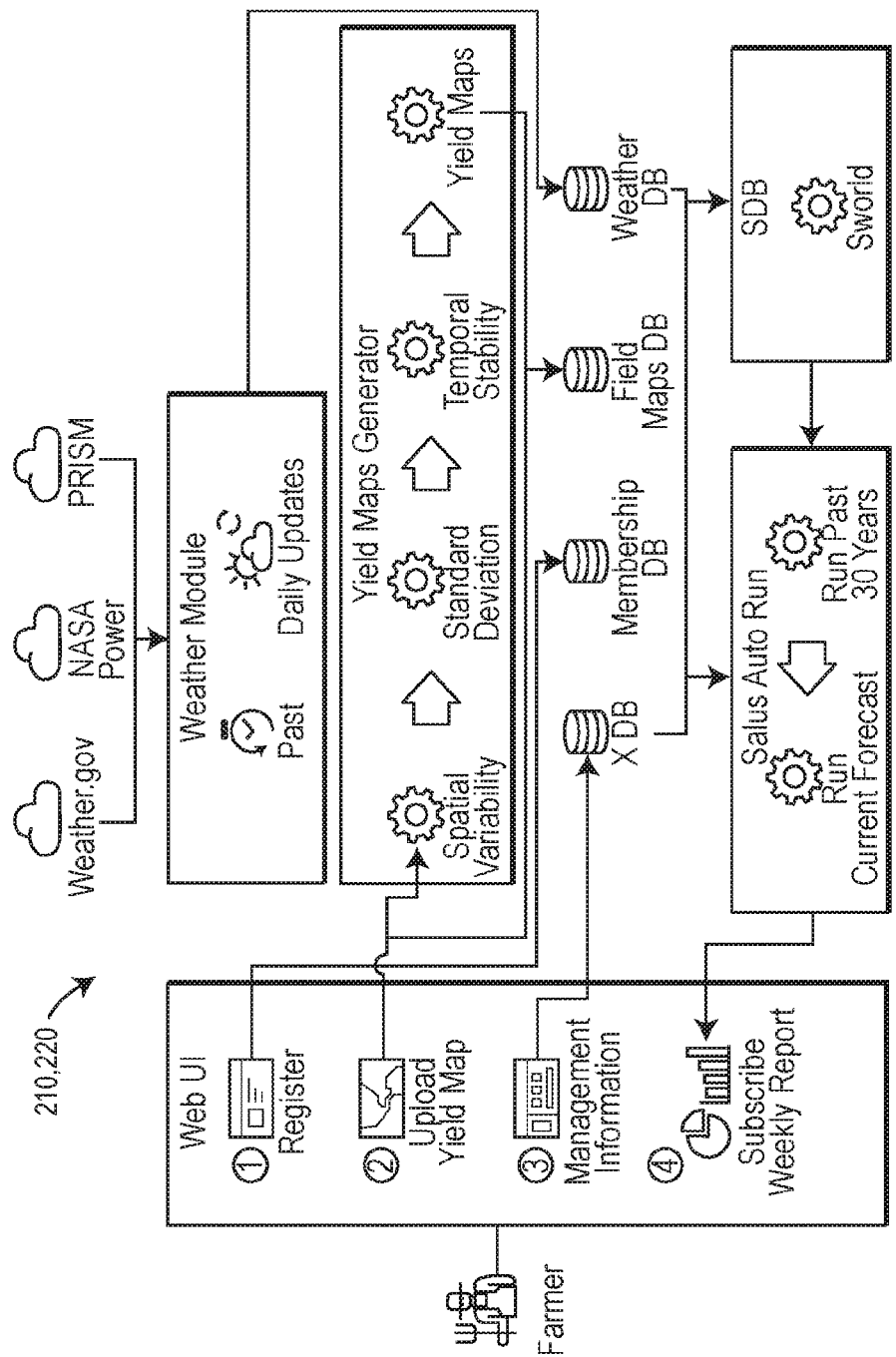

Other inputs 216 to the crop model 212 can include one or more grower-controlled management parameters and/or grower-independent parameters. Such parameters are illustrated in FIGS. 2A-2C in more detail, which illustrate common crop model inputs and outputs according to the disclosure. The grower-controlled management parameters represent crop model inputs that can be arbitrarily selected according to the actions of the grower who will eventually plant and oversee the growth of the crop (e.g., actions for the field as a whole or as a spatially dependent parameter). Examples of grower-controlled management parameters include crop plant species, crop plant cultivar, tilling plan (e.g., whether to till, timing and depth of same if applicable), pest management schedule (e.g., timing, frequency, etc.), pest management chemicals (e.g., one or more herbicides, one or more pesticides, combinations thereof, etc.), irrigation amount (e.g., volume or mass per unit field area), irrigation schedule (e.g., timing, frequency, etc.), fertilization amount (e.g., volume or mass per unit field area), fertilization type (e.g., chemical species), fertilization schedule (e.g., timing, frequency, etc.), planting time (e.g., planned time/date $t_o$ to plant crop), and harvest time (e.g., planned time/date $t_f$ to harvest grown crop). The grower-independent parameters represent crop model inputs that characterize field properties (e.g., for the field as a whole or as a spatially dependent parameter) that generally are not changed (or cannot be changed) by the actions of the grower who will eventually plant and oversee the growth of the crop. Examples of grower-independent parameters include soil type, soil depth, soil chemical constituents (e.g., water content, carbon content, nitrogen content, phosphorous content), soil thermal characteristics (e.g., soil temperature).

Outputs from the crop model 212 include final field state properties (e.g., field state at the end of the modeled time period, such as at a final time $t_i$ for (planned) crop harvest), for example as illustrated in FIGS. 2A-2C, as well as the crop management plan 210.

The final field state properties can include final soil chemical constituents (e.g., water content, carbon content, nitrogen content, phosphorous content after growing or other time period), soil thermal characteristics (e.g., soil temperature after growing or other time period). The final field state properties can further include net biomass/crop growth (e.g., for the field as a whole and/or as a position-dependent value throughout the field), which can correspond to crop yield (e.g., when determined at the final time $t_f$ for harvest) as well as other yield- or growth-based values (e.g., field- or position-dependent gross or net profit, based on (estimated) crop sale price and (estimated) operating costs). The final field state properties can further include losses from the field and/or sources to the external environment relative to the modeled field domain, for example including atmospheric flux of one or more of gaseous species to the external environment (e.g., greenhouse gas emission such as $N_2O$ and/or $CO_2$ flux, loss of gaseous water), drainage or leaching of one or more soil chemical species or nutrients (e.g., nitrogen and/or phosphorous leaching from soil), and runoff or soil erosion (e.g., loss of soil, resulting in a shallower soil depth for the next growing season).

The crop management plan 210 corresponds to a selection or prescription of actions to be implemented by the grower initially upon planting and/or subsequently during growing midseason, and they generally correspond to the grower-controlled management parameters that are implemented by the grower. Examples of grower-controlled management parameters include crop plant species, crop plant cultivar, tilling plan (e.g., whether to till, timing and depth of same if applicable), pest management schedule (e.g., timing, frequency, etc.), pest management chemicals (e.g., one or more herbicides, one or more pesticides, combinations thereof, etc.), irrigation amount (e.g., volume or mass per unit field area), irrigation schedule (e.g., timing, frequency, etc.), fertilization amount (e.g., volume or mass per unit field area), fertilization type (e.g., chemical species), fertilization schedule (e.g., timing, frequency, etc.), planting time (e.g., planned time/date $t_o$ to plant crop), and harvest time (e.g., planned time/date $t_f$ to harvest grown crop). Actions that are performed initially or at an initial time $t_o$ (e.g., tilling, planting, initial fertilization, etc.) are generally performed on or before the planting date (e.g., relative to the physical planting event) as part of the initial crop management activities. More generally, some initial activities could be post-planting in various embodiments, but they can be performed prior to an intermediate time $t_i$ (described below) when the crop management plan is updated. The actual timeframe for specific management actions can be location- or field-specific. For instance, tillage and/or initial fertilizer application can be performed in the fall, or in the spring, which can roughly coincide with a corresponding planting event, or which can be well in advance of the corresponding planting event (e.g., fall post-harvest tillage in preparation for a planting event in the following spring). Specific planting time/date depends on the crop, location and the hemisphere (southern or northern). As an illustrative example, a typical situation for corn grown in the U.S. Midwest is that tillage, planting, and initial fertilization are done in late April all on the same day or within 1-2 days of each other, and the particular schedule for a field can be an element of the crop management plan 210.

The grower-controlled management parameters can be the same as or a subset of the corresponding parameters serving as the inputs 216 to the crop model 212. The crop management plan 210 is provided by the crop model 212 by optimizing one or more of the field state properties resulting from the crop model 212 material and/or energy balances. Namely, one or more input management parameters can be varied (e.g., parametrically varied according to known computational techniques) to identify one or more corresponding crop management plan 210 parameters (e.g., as a specific value or action, or a range of values or actions) which result in a preferred field state property (or properties). In some embodiments, the crop management plan 210 is spatially variable for the field, and at least one management parameter in the plan 210 is different for different spatial regions of the field (e.g., different crops planted in different regions, different irrigation plan in different regions, different fertilization plan in different regions, etc.).

In various embodiments, the crop management plan 210 for the field provided by the crop model 212 (e.g., including one or more management parameters to be implemented by the grower) optimizes one or more field state properties (e.g., at the end of the growing season, such as at or after harvest time $t_f$) such as crop plant yield, crop plant quality (e.g., grain quality or protein content), crop plant marginal net return, soil organic content, and environmental pollutant generation. Optimization of a property can include, for example, maximizing a desired property, meeting or exceeding a minimum threshold for a desired property, minimizing an undesired property, being at or below a maximum threshold for an undesired property, maintaining any property in a range, and/or increasing or decreasing a desired or undesired property relative to a baseline or target value. Example desired properties include crop yield and crop net return. Example undesired properties include: environmental pollutant generation such as greenhouse gas emission (e.g., $N_2O$, $CO_2$), nitrogen leaching from soil, soil organic content loss, etc. The optimized parameters can be determined on a whole-field basis or on a portion of the field (e.g., a higher target crop yield in one portion of the field and a relatively lower target crop yield in another portion of the field). If two or more field state properties are being optimized (e.g., two or more properties related to the same field quantity; two or more properties related to the different field quantities), a weighted and/or constrained optimization system can be used by the crop model 212 to determine the crop management plan 210. For example, the crop model 212 can implement a multi-parameter system in which two or more field state properties are optimized with weighting factors reflecting a relative importance of each field property. Alternatively or additionally, the crop model 212 can implement a multi-parameter system in which one or more field state properties are optimized in view of one or more (range or threshold) constraints for one or more other field state properties, where such constraints can represent sustainable agricultural policy, governmental regulation, etc. For example crop yield and/or net return can be maximized while minimizing or staying below nitrogen leaching and/or greenhouse gas emission thresholds.

With reference to FIG. 1, after determination of the crop management plan 210, the plant is planted (step 110) in the field at an initial planting time/date ($t_o$) according to the crop management plan 210. The initial planting time can be specified by the crop management plan 210, although the actual time at which the plant is planted can be within 1, 2, 3, 5, or 7 days of the planned time based on the crop model 212 output. The plant planted in the field can include a single plant or two or more different plants (e.g., different species or cultivars of plants in different regions of the field). In various embodiments, the plant is a crop plant such as corn or maize, wheat, soybean, oats, barley, rice, sorghum, one or more cultivars thereof, and combinations thereof. Other crop plants include annuals (e.g., trees and/or shrubs, such as in a nursery setting), perennials (e.g. horticultural plants or other crops such as tomatoes, potatoes, sunflowers, etc.), vines, olive trees, and other specialty crops (e.g., cherry, apples, pecan, etc.). Many known crop models are well developed for the prominent cereal crops (e.g., corn, wheat, oats) and other prominent food crops (e.g., soybean), but such existing models can be adapted using known modeling techniques to apply to better represent different crops (e.g., by tuning existing models and/or adding relevant terms to existing models for specific plants). After the plant is planted in the field at the initial planting time/date ($t_o$), the plant is further grown (step 120) until an intermediate time ($t_i$) between the initial time ($t_o$) and a planned final time ($t_f$) for harvesting the plant (e.g., where the planned final harvest time is a crop management plan 210 parameter).

As further illustrated in FIG. 1, crop management activities are performed by the grower (step 130) at one or more points in time, including before planting 110, at planting 110, and/or after planting 110/while growing 120 and before the intermediate time ($t_i$). The crop management activities 130 can be performed at single points in time (e.g., tilling, planting, early season fertilizer application) or at multiple points in time (e.g., periodic irrigation), depending on the nature of the activity and the crop management plan 210 prescription. Preferably, the crop management activities 130 are performed according to the crop management plan 210 (e.g., activities substantially or completely following prescriptions provided in the crop management plan 210). In some embodiments, however, grower-selected deviations from the initial crop management plan 210 are possible without necessarily having an explicit adjusted plan provided by the crop model. For example, a grower might modify an initial crop management plan 210 parameter based on actual, unexpected events occurring during the growing season (e.g., changing pest management plan based on an unforeseen pest infestation; altering irrigation plan based on an unforeseen precipitation levels) and before determination of an updated crop management plan 220 (described below). In some embodiments, the final harvest time ($t_f$) can be planned based on initial crop model 212 prediction and crop management plan 210, but the actual harvest time can be different based on the updated plan 220 midseason.

As illustrated in FIG. 1, after planting 110 and growing 120 the plant for a period and at a time prior to harvest, an updated crop management plan 220 is determined at the intermediate time ($t_i$) using a crop model 222. The intermediate time ($t_o < t_i < t_f$) at which the updated crop management plan 220 is determined can be at a time which is 0% or 5% to 20%, 20% to 40%, 40% to 60%, 60% to 80%, or 80% to 95% or 100% of the interval between initial planting time and planned harvest time ($t_f - t_o$). Suitably, the intermediate time is in the vicinity of mid-growing season and/or prior to a second application of fertilizer (e.g., in split-application fertilization plan with a first fertilizer application near initial planting and a second fertilizer application during the season). The crop models 212, 222 are generally the same model (e.g., employing the same material and energy balance models with corresponding model constants, etc.), but they differ in terms of input 226 information used to determine the corresponding crop management plans 210, 220. The crop model 212 generally uses projected weather data for the period between the initial planting time and the planned harvest time to determine an initial predicted yield 310 and the corresponding crop management plan 210. In contrast, the crop model 222 uses actual weather data (e.g., actual incident solar radiation, actual maximum and minimum temperature, and/or actual rainfall) as an input 226 for the weather conditions experienced by the field for at least the period between initial planting and the intermediate time (e.g., possibly going back further in time prior to initial planting, such as to the end of the historical weather data used to provide the initial crop management plan 210), and the model 220 uses projected weather data as an additional input 226 for the period between the intermediate time and the planned harvest time to determine an updated predicted yield 320 and other final field state properties at harvest.

The particular source of the projected weather information, whether used in connection with the initial or updated crop management plan 210 or 220, is not particularly limited, but it can represent forecast data for the field (e.g., meteorological forecast available at a time at or before the initial planting time), probabilistic weather data based on historical weather data for the field, and combinations thereof (e.g., multiple selected discrete weather scenarios, weighted combinations of different weather information sources). In some embodiments, multiple future weather scenarios can be used with the crop models 212, 222 to determine corresponding crop management plans 210, 220, predicted yields 310, 320, etc. For example, given a baseline prediction for the projected weather information (e.g., a probable or most probable future weather outcome based on any known weather prediction methods), one or more future weather scenarios departing from the baseline prediction can be used, such as various combinations of (a) baseline value, (b) higher-than-baseline value, and (c) lower-than-baseline value with weather parameters such as (i) incident solar radiation, (ii) maximum and minimum temperature, and (iii) rainfall. Illustrative future weather scenarios include one or more of (1) higher-than-baseline temperature, baseline solar radiation, and baseline rainfall; (2) lower-than-baseline temperature, baseline solar radiation, and baseline rainfall; (3) baseline temperature, baseline solar radiation, and higher-than-baseline rainfall; (4) baseline temperature, baseline solar radiation, and lower-than-baseline rainfall; (5) baseline temperature, higher-than-baseline solar radiation, and baseline rainfall; and (6) baseline temperature, lower-than-baseline solar radiation, and baseline rainfall. Lower and higher relative to a baseline value can represent, for example, at least 0.5° C., 1° C., 2° C., or 3° C. and/or up to 1° C., 2° C., 5° C., or 10° C. hotter or colder than baseline (e.g., for minimum and/or maximum daily temperature), or at least 2%, 5%, 10%, or 20% and/or up to 5%, 10%, 20%, or 50% higher or lower than baseline (e.g., for solar radiation or rainfall).

In an embodiment, the projected weather for the current growing season can be based on the actual historical weather experienced during the corresponding seasonal period of a previous growing season. This approach can be useful when the known weather to date in the current growing season is identified as being substantially similar to the known weather of a particular previous growing season (e.g., similar in terms of incident solar radiation, maximum and minimum temperature, and/or rainfall). As an illustrative example, if it is desirable to project weather information for a field for July-September of 2014 and the actual weather observed for the field from April-June of 2014 (e.g., a current year) is substantially similar to the actual weather observed for the field from April-June of 1988 (e.g., a previous year), then the projected weather for the field for July-September of 2014 can be taken to be the same as the actual weather for the field for July-September of 1988.

Other inputs 226 to the crop model 220 can include one or more grower-controlled management parameters and/or grower-independent parameters as generally described above for the crop model 212. The grower-controlled management parameters for the crop model 220 represent crop model inputs that can be arbitrarily selected according to the actions of the grower that are possible for manipulation or change during the growing season (e.g., a subset of initial inputs 216, since some actions are not applicable midseason, such as plant species/cultivar selection, planting time, tilling plan, etc.). Examples of grower-controlled management parameters include pest management schedule, pest management chemicals, irrigation amount, irrigation schedule, fertilization amount, fertilization type, fertilization schedule, and harvest time. Examples of grower-independent parameters are similar to above and include soil type, soil depth, soil chemical constituents (e.g., water content, carbon content, nitrogen content, phosphorous content), soil thermal characteristics (e.g., soil temperature), whose initial input values for the crop model 220 can be determined from the corresponding output values and final field state properties from the crop model 212.

Another input 226 to the crop model 220 can include the crop management activities 130 performed on the field up to the intermediate time. In some embodiments, the crop management activity 130 input simply represents the prescription provided by the crop management plan 210 (e.g., in the absence of information as to the management activities performed by the grower up to the intermediate time). In other embodiments, the crop management activity 130 input represents the actual management activities performed by the grower up to the intermediate time, for example where the grower confirms adherence to the crop management plan 210, or where the grower provides or otherwise reports actual management activities (e.g., including in-season deviations from the crop management plan 210) to a party performing the crop modeling.

In an embodiment, another input 226 to the crop model 220 can include remotely sensed plant nitrogen data for the field at a point in time between the initial time ($t_o$) and the intermediate time ($t_i$) (e.g., at or within 1, 2, 3, 5, or 7 days of the intermediate time). Remotely sensed nitrogen generally corresponds to an optical measurement of one or more plant indices which correlate to plant nitrogen, canopy nitrogen, etc. (e.g., optical reflectance at one or more characteristic wavelengths corresponding to a given index). Example indices which are known and suitably correlate to various nitrogen contents include the canopy content chlorophyll index (CCCI) and the canopy nitrogen index (CNI), among others, for example as described in Cammarano (2011) and Cammarano (2014). Optical measurements can be aerial optical measurements, for example as remotely detected from the air by a unmanned aerial vehicle (UAV) or other aircraft equipped with suitable optical detection equipment (e.g., capable of making rapid optical measurement at field-relevant spatial scales, such as with a resolution at 100 $m^2$, 25 $m^2$, 4 $m^2$, or 1 $m^2$ or less, which spatila scales similarly can represent computational scales of the crop models). Nitrogen content, as determined by remote sensing, is known to correlate to plant biomass (e.g., and ultimately plant yield at the end of the growing season). The nitrogen content may be sensed by the grower, a party performing the crop modeling for the grower, or otherwise.

In some embodiments, remotely sensed nitrogen provides a crop model 222 validation point, because it essentially provides an in-season instantaneous measurement of plant yield (e.g., current biomass) at a given point in time (e.g., at a time at or before the intermediate time), which yield can be compared to the yield predicted by the crop model. In some refinements, this in-season yield measurement can be used as an input to refine future model calculations and yield predictions in the growing season. In other refinements, the in-season yield measurement is not used as an input for future model calculations and yield predictions during the season, but provides additional confidence regarding the accuracy of the crop model predictions (e.g., when the crop model yield and the measured yield based on remote nitrogen sensing substantially match at the time of remote sensing).

In some embodiments, remotely sensed nitrogen can indicate that some unexpected event has occurred that is outside of the crop model prediction capabilities. In this case, the remotely sensed nitrogen data and its corresponding biomass values can be used to take corrective action (e.g., in the updated management plan 220) and/or to reset the crop model 220 predictions for the remaining growing season. For example, lower-than-expected plant yield measures by remote sensing (e.g., as compared to the crop model 220 prediction) in a certain region of a field might indicate a localized pest problem damaging crops in the region. In this case, the updated crop management plan 220 could include a more aggressive pest management plan in the region (e.g., additional or more frequent pesticide or herbicide spraying), and the crop model 222 biomass values in the region can be reset according to the measurement to reflect low yields and/or plant damage for remainder of season in the region. Examples of other unplanned, extra-model events that similarly can be detected via remote sensing and accommodated by the updated crop management plan 220 and/or crop model 222 include animals (e.g., deer or other wild animals) trampling and damaging or destroying a portion of the field, a hailstorm, tornado, or other extreme weather event damaging or destroying a portion of the field. With such extreme events, the damaged or destroyed field region can be modeled as non-producing or low-producing for the remainder of the growing season to improve the net field yield prediction at the end of the season.

As above for the crop model 212, outputs from the crop model 222 include final field state properties (e.g., field state as described above at the end of the modeled time period, such as at a final time $t_f$ for (planned) crop harvest), as well as the updated crop management plan 220. The updated crop management plan 220 corresponds to a selection or prescription of actions to be implemented by the grower after the initial time and prior to harvest, and they generally correspond to the grower-controlled management parameters that are implemented by the grower during this period. Examples of grower-controlled management parameters include pest management schedule (e.g., when remote nitrogen sensing or other information source indicates plant damage or other need for additional pest management), pest management chemicals, irrigation amount, irrigation schedule, fertilization amount, fertilization type, fertilization schedule, and harvest time. Also similar to the crop model 212, the grower-controlled management parameters can be the same as or a subset of the corresponding parameters serving as the inputs 130, 226 to the crop model 222. The updated crop management plan 220 is provided by the crop model 222 by optimizing one or more of the field state properties resulting from the crop model 222 material and/or energy balances. In some embodiments, the updated crop management plan 220 is spatially variable for the field, and at least one management parameter in the plan 220 is different for different spatial regions of the field. In various embodiments, the updated crop management plan 220 optimizes one or more field state properties (e.g., at the end of the growing season, such as at or after harvest time $t_f$) such as crop plant yield, crop plant quality, crop plant marginal net return, soil organic content, and environmental pollutant generation as described above. The same or different optimization criteria can be used for the crop management plan 210 and the updated crop management plan 220.

In an embodiment, at least one crop management item is different in the updated crop management plan 220 relative to the corresponding crop management item from the initial crop management plan 210. This reflects a situation where the updated plan 220 changes at least one management strategy from the initial plan 210, for example as a result of actual weather experienced during the growth season which was substantially different from the projected weather used to generate the initial crop management plan 210. This similarly can apply to consecutive updated management plans (described below). In other cases, however, it is possible the updated crop management plan 220 re-confirms that the initial plan 210 (or previous updated plan) is still a preferred plan to meet target optimization criteria, for example with a greater level of confidence based on the accumulation of in-season data growth and/or actual weather data.

In an embodiment, the initial crop management plan 210 includes at least one fertilization management item (e.g., a fertilization amount, a fertilization type, fertilization location, a fertilization schedule) and the updated crop management plan 220 includes at least one updated fertilization management item (e.g., an updated fertilization amount, an updated fertilization type, an updated fertilization location, an updated fertilization schedule) relative to the crop management plan 210. For example, a common fertilization management strategy includes a split-application plan for a fertilizer such as a nitrogen-containing fertilizer. In a split application plan, (i) an initial fertilizer amount (e.g., 30% of planned total) and fertilizer type and (ii) a subsequent planned midseason fertilizer amount (e.g., 70% of planned total), fertilizer type, fertilizer location, and planned fertilization time are specified in the initial crop management plan 210. The grower then can perform the initial portion of the split-application plan, for example applying the initial fertilizer amount according to the initial plan 210 at or near the initial planting time. When the updated crop management plan 220 is determined at the intermediate time using actual weather data, the updated plan 220 can specify a (iii) subsequent midseason fertilizer amount (e.g., possibly near to or far from originally planned subsequent amount and total fertilizer, fertilizer type, fertilizer location, and planned fertilization time, any or all of which can be different from the corresponding fertilization management item in the initial plan 210. The grower then can perform the subsequent portion of the split-application plan according to the updated plan 220.

In many cases, one or more fertilization items from initial crop management plan 210 will benefit by at least some updating during the season, which is reflected in the updated crop management plan 220. In some refinements, the fertilization management plan can include one or more of a spatially dependent timing of application, amount of application, and number of applications. In many cases the initial and updated fertilization management plan are 2-application plans, but the timing and/or amount of second (subsequent) fertilization event could vary between plans. In other cases, it is possible that updated plan is a 1-application plan (e.g., indicating that no further fertilization during the season is desirable, for example for some region or all of the field) or a 3-(or more) application plan (e.g., indicating that more than one additional fertilization event during the season is desirable). Because some degree of fertilization management plan update is often desirable, determination of multiple updated crop management plans 220 during a given season can be desirable.

In an embodiment, the initial crop management plan 210 includes at least one irrigation management item (e.g., an irrigation amount, an irrigation schedule), and the updated crop management plan 220 includes at least one updated irrigation management item (e.g., an updated irrigation amount, an updated irrigation schedule) relative to the initial plan 210. This embodiment can be applicable if the field has water available for irrigation. In some areas, irrigation water is readily available, but growers do not irrigate regularly because the field generally receives sufficient rain. In such areas, the updated crop management plan 220 can indicate whether additional secondary irrigation is desirable and/or economical. For example, a cost-benefit analysis provided by the crop model 222 could indicate that easily accessible secondary irrigation (e.g., via a field-located well or otherwise) could increase yield and/or return, even if not needed to avoid plant damage due to seasonal drought conditions.

As further illustrated in FIG. 1, after the updated crop management plan 220 is determined, the plant is further grown (step 160), for example until about the planned final time ($t_f$) for harvesting the plant (e.g., where the planned final harvest time is an updated crop management plan 220 parameter). Updated crop management activities are performed by the grower (step 150) at one or more points in time, for example up to and including the harvest time (e.g., between the intermediate time ($t_i$) and the final time ($t_f$)), although in some embodiments the updated plan 220 and corresponding activities 150 can be extended post-harvest (e.g., post-harvest tillage or fertilizer (or other chemical) application in preparation for the next growing season, which could be months away). As above, the updated crop management activities 150 can be performed at single points in time (e.g., plant harvest; mid- or late-season fertilizer application, such as a second or subsequent application in a split-application fertilization plan) or at multiple points in time (e.g., periodic irrigation), depending on the nature of the activity and the updated crop management plan 220 prescription. Preferably, the updated crop management activities 150 are performed according to the updated crop management plan 220 (e.g., activities substantially or completely following prescriptions provided in the updated plan 220). In some embodiments, however, grower-selected deviations from the updated crop management plan 220 are possible without necessarily having an explicit adjusted plan provided by the crop model.

As illustrated in FIG. 1, the plant can be further grown (step 160) according to the updated crop management activities 150 until plant harvest (e.g., at or about planned final time ($t_f$)). In some embodiments, the crop plant can be further grown (step 160) according to the updated crop management plan 220 until a new updated crop management plan is determined at a new intermediate time ($t_i^{NEW}$) before plant harvest (e.g., where the new intermediate time ($t_i^{NEW}$) is after the intermediate time ($t_i$) and before the final time ($t_f$)). The new updated crop management plan suitably is followed until itself is further updated or until the end of the growing season, but grower deviations subsequent to the updated crop management plan are possible. For example, although FIG. 1 illustrates a feedback loop including a single crop modeling-updated crop management plan-updated crop management activity cycle during a single plant-grow-harvest season, a more general method of plant growth or plant management according to the disclosure can include repeating the feedback loop with improved crop model accuracy (e.g., based on in-season actual weather information and/or other in-season information) to provide a plurality of updated crop management plans 220(j) at a plurality of intermediate times (e). For example, updated management plans 220(1), 220(2), 220(3), ... 220(n) can be determined at times $t_o < t_i^{(1)} < t_i^{(2)} < t_i^{(3)} < \ldots < t_i^{(n)} < t_f$ during a single season. Each updated crop management plan 220(j) can be determined using actual weather data up to intermediate times $t_i^{(i)}$, projected weather data afterward, as well as previously performed crop management activities and other inputs as described above for the updated crop management plans 220. The frequency of the updated plans 220(j) (or time between consecutive plans 220(j)) can be the same or different, such as at least 1, 2, 3, 5, 7, 10, or 14 days and/or up to 2, 3, 5, 7, 10, 14, 21, 28, 30, 42, 56, or 60 days, and/or at intervals equal to any of the foregoing periods (e.g., daily, bi-weekly, weekly, semi-weekly, monthly).

As illustrated in FIG. 1, after growing 160 the plant according to the updated crop management plan 220 (e.g., performing the crop management activities 150 substantially or completely following prescriptions provided in the updated plan 220), the plant is harvested at or about the planned final time ($t_f$), for example where the planned final time is a crop management parameter specified in the initial crop management plan 210, the updated crop management plan 220, or both. The actual final time at which the plant is harvested need not be identical to the planned final time. For example, the actual final time for harvest could be within 1, 2, 5, 7, 10, 14, or 21 days relative to the planned final time for harvest (e.g., from the initial plan 210), whether based on the updated crop management plan 220 midseason and/or other decisions by the grower outside of the management plan/model predictions.

As illustrated in FIG. 1 and described above, an initial predicted yield 310 (e.g., determined at a time prior to planting) and an updated predicted yield 320 (e.g., determined at a time between planting and harvest) can be determined using the crop models 212, 214 in combination with historical weather data, in-season actual weather data, and in-season projected weather data as well as other inputs (e.g., crop management plans 210, 220 and/or actual crop management activities 130, 150).

In an embodiment, the grower can buy and/or sell (step 330) prior to harvest one or more crop- or plant-related financial instruments (e.g., crop futures, crop insurance) based on the updated predicted yield 320, for example in relation to the initial predicted yield 310 (or an earlier-in-time updated predicted yield 320 determined from an updated crop model at an earlier time during the season). For example, crop futures could be initially sold by a grower near or prior to planting based on the predicted yield 310 of the initial crop management plan 210 (e.g., a predicted yield amount corresponding to a particular confidence level from the initial crop management plan 210, such as a 50%, 75%, 90%, 95% predicted likelihood that the eventual field yield will be at or above a threshold level). Relative to this action, the updated yield prediction 320 could allow the grower to take appropriate midseason action prior to harvest, for example: (i) selling additional futures if the midseason yield prediction 320 is above the initial yield prediction 310 or an already-sold amount of futures, for example based on the same or different confidence level, or (ii) purchasing additional futures to cover a potential shortfall if the midseason yield prediction 320 prediction is below the initial yield prediction 310 or an already-sold amount of futures, for example based on the same or different confidence level. Analogous activity also is possible based on a comparison of at least two different updated predicted yields 320 determined at different points in time (e.g., selling additional futures when a newer updated yield prediction 320 is above an older updated yield prediction 320, purchasing additional futures when a newer updated yield prediction 320 is below an older updated yield prediction 320). Alternatively, crop insurance could be initially purchased by a grower near or prior to planting based on the predicted yield 310 of the initial crop management plan 210 (e.g., a predicted yield amount corresponding to a particular confidence level from the initial crop management plan 210, such as a 50%, 75%, 90%, 95% predicted likelihood that the eventual field yield will be at or above a threshold level). Relative to this action, the updated yield prediction 320 could allow the grower to take appropriate midseason action prior to harvest, for example purchasing additional crop insurance (e.g., from a private insurer) to cover a potential shortfall if the midseason yield prediction 320 prediction indicates a likelihood that the level of initially purchased crop insurance will be insufficient to cover end-of-season losses.

In another embodiment, an insurer can sell (step 330) crop insurance for one or more plants in the field according to an insurance parameter determined using at least one of the initial predicted yield 310 and the updated predicted yield 320. Example insurance parameters include insurance cost (e.g., premium, deductible), insurance basis (e.g., crop yield, crop income), specific events insured against damage (e.g., any event causing damage or yield loss, pest damage, weather-related loss such as drought), etc. In an embodiment, field-specific crop-yield (or crop-income) insurance can be sold, for example where the yield expectation (or corresponding income expectation based on current market value or other economic indicia) for a given field that is used to determine the cost of insurance and/or the level at which an insurance claim may be made includes input from the crop model 212 and/or 222 prediction, such as the predicted yield 310 and/or 320. The insurance could be sold pre-season (e.g., prior to planting, such as based on the crop model 212 and the initial predicted yield 310). Additionally or alternatively, the insurance could be sold mid-season (e.g., at or after the intermediate time when the updated predicted yield 320 is determined from the crop model 222). In a refinement, the insurance, whether sold pre- or mid-season, can be spatially variable. For example, the yield threshold for an insurance claim can be lower in a part of a field that is predicted to be low yielding in the current season, and the yield threshold can be higher in another part of a field that is predicted to be high yielding in the current season. In some embodiments, the determination of the updated predicted yield 320 and sale of a corresponding mid-season crop insurance product can be performed in response to a specific request from a grower (e.g., a mid-season, on-demand insurance product in which specific insurance parameters of the crop insurance product are determined using the crop model 222 with up-to-current mid-season weather, such as also with a specification and/or certification by the grower regarding any actual crop management activities 130, 150 to date).

In another embodiment, the initial predicted yield 310 and the updated predicted yield 320 can be determined using the crop models 212, 222 (e.g., using the various historical, actual, and projected weather and other inputs above) for multiple different fields, for example fields within the same geographical region. The predicted yields 310, 320 for each field can be determined independently from each other (e.g., using crop models 212, 222 and management plans 210, 220 specific to each field). The scope of the geographical region is not particularly limited, for example corresponding to a single state or province, two or more (adjacent) states or provinces (e.g., constituting an entire country or entire adjacent countries), a sub-region of a single state or province, etc. For example, the geographical region can include fields within a 10 km, 20 km, 50 km, 100 km, 200 km, 500 km, or 1000 km radius of a central location in the region. In some embodiments, all agricultural fields in the region can be included in the yield predictions. In other embodiments, only agricultural fields in the region growing a specific plant, two or more specific plants, or one or more cultivars thereof are included in the yield predictions. Based on the aggregate predicted yields, crop futures for the crop plant(s) to be grown or being grown on the field can be bought and/or sold (step 330) by a party (e.g., the grower, a service provider generating crop management plans for one or more growers in the region, a commodities broker), for example based on initial predicted yield 310 and/or based on a comparison between the updated and initial predicted yields 310, 320 (e.g., where the updated yield is higher or lower yield than originally predicted, for example as described above).

After or during harvesting 170 of the plant, the actual yield 180 of the plant can be measured. The actual yield can represent the net yield for the field as a whole. Suitably, however, the actual yield is measured as a function of location on the field (e.g., local actual yield per unit area as a function of position), for example using any conventional harvesting apparatus (e.g., combine harvester or otherwise) including a means for measuring and reporting position (e.g., global positioning system (GPS) receiver or otherwise to measure and report current position) and a means for measuring and reporting plant amount harvested (e.g., on-board scale or otherwise to measure and report current amount or mass of crop plant harvested, which can be correlated to current position). The actual yield is generally measured by the grower after or during harvest. The actual yield value then can be provided (e.g., by the grower) to any third party of interest, such as a crop modeling or crop management service, an insurer, a governmental or other regulatory body, or any other party to whom the grower has an obligation to report actual yield. The actual yield can be used, for example, to confirm crop model state at the end of growing season and/or to re-initialize a crop model 242 for the next growing season using one additional year of yield and weather data.

In an embodiment, one or more compliance parameters can be evaluated for the harvested plant using a crop model 232, the actual yield 180 for the crop plant, and the actual weather for the growing season. The compliance parameters can be evaluated by the grower or by any third party of interest to whom the actual yield is reported, such as a crop modeling or crop management service, an insurer, or a governmental or other regulatory body. A compliance parameter can include an environmental-based limitation, which can be a governmental or regulatory requirement, or a contractual obligation of the grower. For example, a grower might be limited in terms of maximum fertilizer applied to a field, maximum irrigation applied to a field, maximum nutrient leaching (e.g., nitrogen, phosphorous) from a field, maximum greenhouse gas emission (e.g., $N_2O$, $CO_2$) from a field, and/or maximum pesticide or herbicide application to a field. Given the actual weather for the growing season as an input 236 to the crop model 232, the crop model 232 can determine a model yield 340 along with other inputs 236 as generally described above for the crop models 212, 222, and including the crop management activities for the past season (e.g., crop management activities 130, 150 as reported by the grower and/or activities according to any crop management plans 210, 220 determined during the growing season). A comparison between the model yield 340 and the actual yield 180, for example in the form of a report 350 (e.g., provided to or generated by the third party of interest), can indicate whether the grower substantially followed any crop management plans 210, 220 determined during the growing season and/or met any requirement(s) associated with the compliance parameter. For example, when the actual yield 180 is within about 5%, 10%, 20%, 30%, or 50% of the model yield 340 (e.g., expressed on a whole-field basis or based on one or more sub-regions of the field), it can be inferred that the grower substantially followed the crop management plans 210, 220 determined during the growing season and satisfied any compliance parameters, which were included as optimization constraints for the crop models 212, 222 to determine the corresponding plans 210, 220. In a refinement, the specific value of the any compliance parameters for the growing season can be determined and/or reported the third party of interest (e.g., determination both that a nutrient leaching value for the field was below a maximum allowable level and the specific value of the nutrient leaching parameter for the field). Conversely, when the actual yield 180 is substantially different from the model 340 (e.g., outside any of the foregoing ranges), it can be inferred that the grower substantially deviated from the crop management plans 210, 220 determined during the growing season and may have violated one or more compliance parameters. Specific possible compliance parameter violations can be evaluated using the crop model 232 with possible compliance parameter violations as alternative inputs 236 to evaluate which compliance parameters were violated. As an illustration, if the actual yield 180 is twice the model yield 340 (i.e., 100% higher) for a given season, it can be inferred that the grower substantially deviated from the crop management plans 210, 220, for example by applying more nitrogen fertilizer than permitted and/or generating higher $N_2O$ emissions than permitted (e.g., as a result of over-fertilization). In such case, reevaluating the crop model 232 with alternate fertilization management plans can identify (i) what actual nitrogen fertilization level would have been required to achieve the measured actual yield 180 and (ii) what $N_2O$ emission level corresponds to the fertilization level. If the actual nitrogen fertilization and/or the $N_2O$ emission level exceed any corresponding compliance parameters for the values, the grower may be subject to sanctions for violation (e.g., regulatory fines, contract damages, or other disciplinary action).

Crop Model

Crop models are generally known in the art. Generally, a crop model incorporates a variety of plant-, weather-, and field-specific inputs, material balances, and energy balances to compute future plant growth in a field as well as the next flux of material and energy into or out of the field over a period of time (e.g., a single or multiple growing seasons). In an embodiment, the crop model can be incorporated into a crop modeling/crop management system, for example in including a general purpose computer adapted to receive the plant-, weather-, and field-specific inputs (e.g., via user input, from a transient or persistent computer storage medium, remotely via an internet or other network connection). The computer can include a processor to execute the various material balances, energy balances, and predicted plant growth determinations, for example to execute the various process steps described above with respect to the crop model (e.g., as generally illustrated in FIG. 1, such as receiving various inputs and generating corresponding outputs related to the crop models 212, 222, and 232). The computer can further include memory, for example including a transient computer storage medium (e.g., random access memory (RAM)) to store computer-readable instructions for the processor to execute the various process steps described above (e.g., including any of the various crop growth, material balance, energy balance, and other modules described herein) and/or a persistent computer storage medium (e.g., hard drive, solid state drive, flash memory) to store the computer-readable instructions for the processor and/or crop model simulation data (e.g., input data, output data including crop management plans, etc.).

The crop model can be used to evaluate the sustainability of various land and crop management strategies with indicators such as (i) crop productivity, (ii) socioeconomic and ecological well being, and (iii) resource availability. The crop model can help improve land management for sustainable crop production by reducing chemical inputs (e.g., fertilizer application), increasing resource use efficiency (e.g., increased yield, reduced fertilization cost, reduced irrigation cost), enhanced nutrient cycling, and integrated pest management. Model inputs can include long-term crop, soil, and weather data (e.g., measurements of crop yields, soil properties, biogeochemical fluxes).

The following provides a description of the Systems Approach for Land Use Sustainability (SALUS) crop model for evaluating the impact of agronomic management on crop yields, carbon (C) and nitrogen (N) dynamics, and environmental performance. The SALUS model is described by way of illustration, but other crop models known in the art also may be used, for example including CROPGRO for major grain legumes, CERES for cereal crops, and SUBSTOR for crops with belowground storage organs, all of which are available in the Decision Support System for Agrotechnology Transfer (DSSAT) suite of crop models used to simulate crop biomass and yield as influenced by weather, soil, crop management, and crop genotype.

The Systems Approach to Land Use Sustainability (SALUS) (Basso et al. 2006, Basso et al. 2010) is similar to the DSSAT family of models, but further simulates yields of crops in rotation as well as soil, water and nutrient dynamics as a function of management strategies over multiple years. SALUS accounts for the effects of rotations, planting dates, plant populations, irrigation and fertilizer applications, and tillage practices. The model simulates daily plant growth and soil processes on a daily time step during the growing season and fallow periods. SALUS contains (i) crop growth modules, (ii) soil organic matter (SOM) and nutrient cycling modules, and (iii) soil water balance and temperature modules. The model simulates the effects of climate and management on the water balance, SOM, nitrogen (N) and phosphorous (P) dynamics, heat balance, plant growth, and plant development. Within the water balance, surface runoff, infiltration, surface evaporation, saturated and unsaturated soil water flow, drainage, root water uptake, soil evaporation, and transpiration are simulated. Soil organic matter decomposition, along with N mineralization and formation of ammonium and nitrate, N immobilization, and gaseous N losses are also simulated.

Crop development in the SALUS model is based on thermal time calculations modified by daylength and vernalization. Potential crop growth depends on intercepted light using solar radiation data and simulated LAI, and is reduced by water or nitrogen limitations. The main external inputs for the crop growth simulations are the plant genetic coefficients and climate data (e.g., daily solar radiation, precipitation, and air temperature). The SALUS model simulates SOM and N mineralization/immobilization from three soil organic carbon pools (active, slow, and passive) that vary in their turnover rates and characteristic C:N ratios. A soil P model incorporates inorganic P (labile, active, and stable) and organic P dynamics. The soil water balance calculates infiltration, drainage, evaporation, and runoff.

Input data to the SALUS model includes weather, soil and crop management activities, soil properties, genetic characteristics of the crop, and the site location. SALUS accounts for weather variability by using up to several decades of existing weather information to represent a historical weather data period. Daily totals of rainfall and solar radiation along with the maximum and minimum temperature over the historical weather data period provide a relatively accurate crop simulation. Weather data is preferably obtained at a site near the area where the crop model is to be applied, especially for daily rainfall. Temperature and radiation are more spatially uniform, so the weather station need not be on site. Most weather stations record rainfall and temperature but not always solar radiation. Accurate solar radiation data can be obtained from NASA (e.g., directly via an internet connection) with a spatial resolution in 1-degree grid cells. This NASA data source also provides all of the daily weather data input for the SALUS model with the same spatial resolution issues as with solar radiation. Soil input properties include the lower limit of available soil water, the field capacity or drained upper limit (DUL) water content, soil texture, soil bulk density, and soil organic matter content. Irrigation input characteristics include the dates, amounts, and mode of application. The crop variety, genotype, or cultivars also are specified, for example with wheat and corn cultivar information generally being expressed as genetic coefficients, which allow models to simulate crop phenology over a wide range of latitudes and planting times.

Examples

Figure 1A:
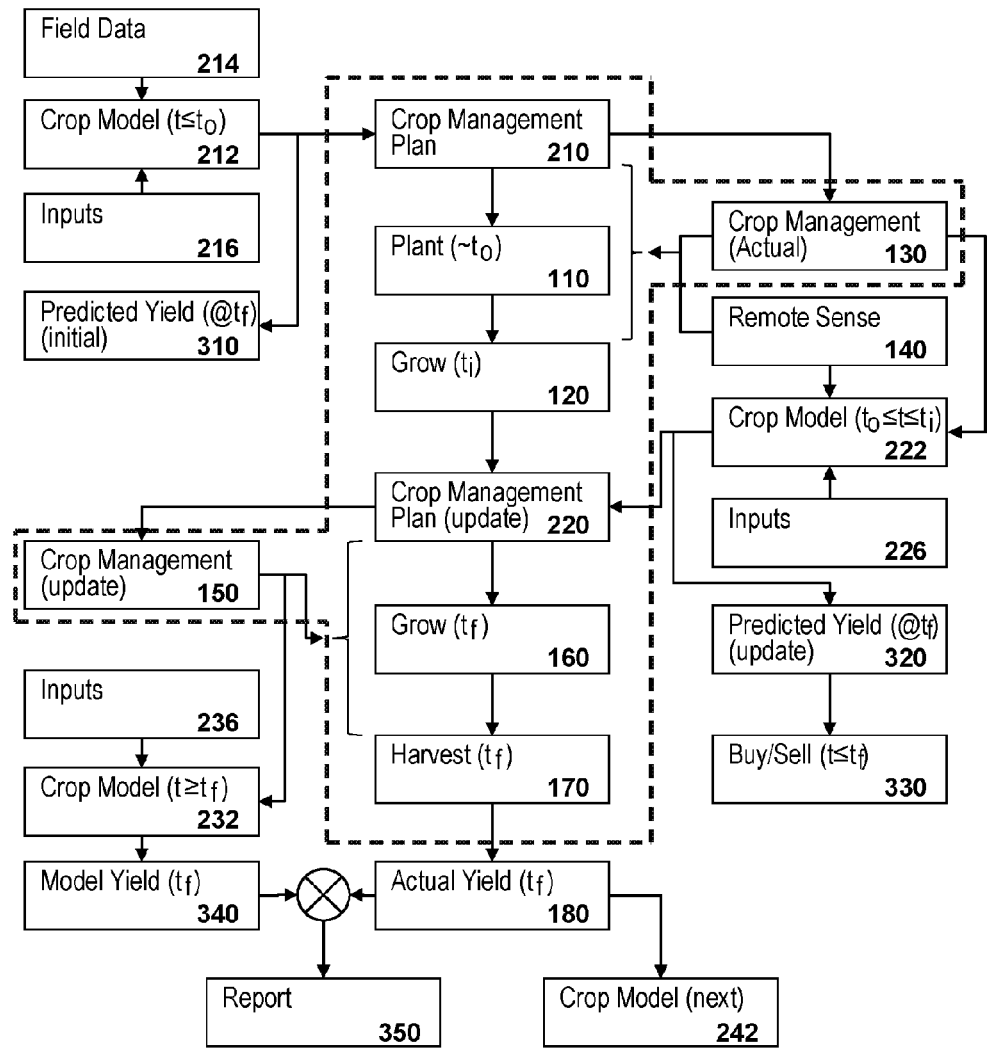
FIG. 1A is a process flow diagram illustrating methods according to the disclosure incorporating precision crop modeling, in particular a method for growing a crop plant, for example as practiced by a small-, medium-, or large-scale grower.

In an aspect, the disclosure relates to a method for growing a crop plant, for example as practiced by a small-, medium-, or large-scale grower. FIG. 1A is a process flow diagram illustrating such a method according to the disclosure incorporating precision crop modeling, in particular a method for growing a crop plant using specific steps from the general process flow diagram of FIG. 1. The illustrated method includes: (a) receiving a crop management plan for a field provided by a crop model; (b) planting a crop plant at an initial time ($t_o$) in the field according to the crop management plan; (c) growing the crop plant until an intermediate time ($t_i$) (e.g., between the initial time ($t_o$) and a planned final time ($t_f$) for harvesting the crop plant); (d) receiving an updated crop management plan for the field provided by a crop model using (i) actual weather data for the field between the initial time ($t_o$) and the intermediate time ($t_i$), and (ii) projected weather data for the field after the intermediate time ($t_i$) (e.g., between the intermediate time ($t_i$) and the planned final time ($t_f$)); (e) growing the crop plant after the intermediate time ($t_i$) according to the updated crop management plan; and (f) harvesting the crop plant (e.g., at about the planned final time ($t_f$)).

Figure 1B:
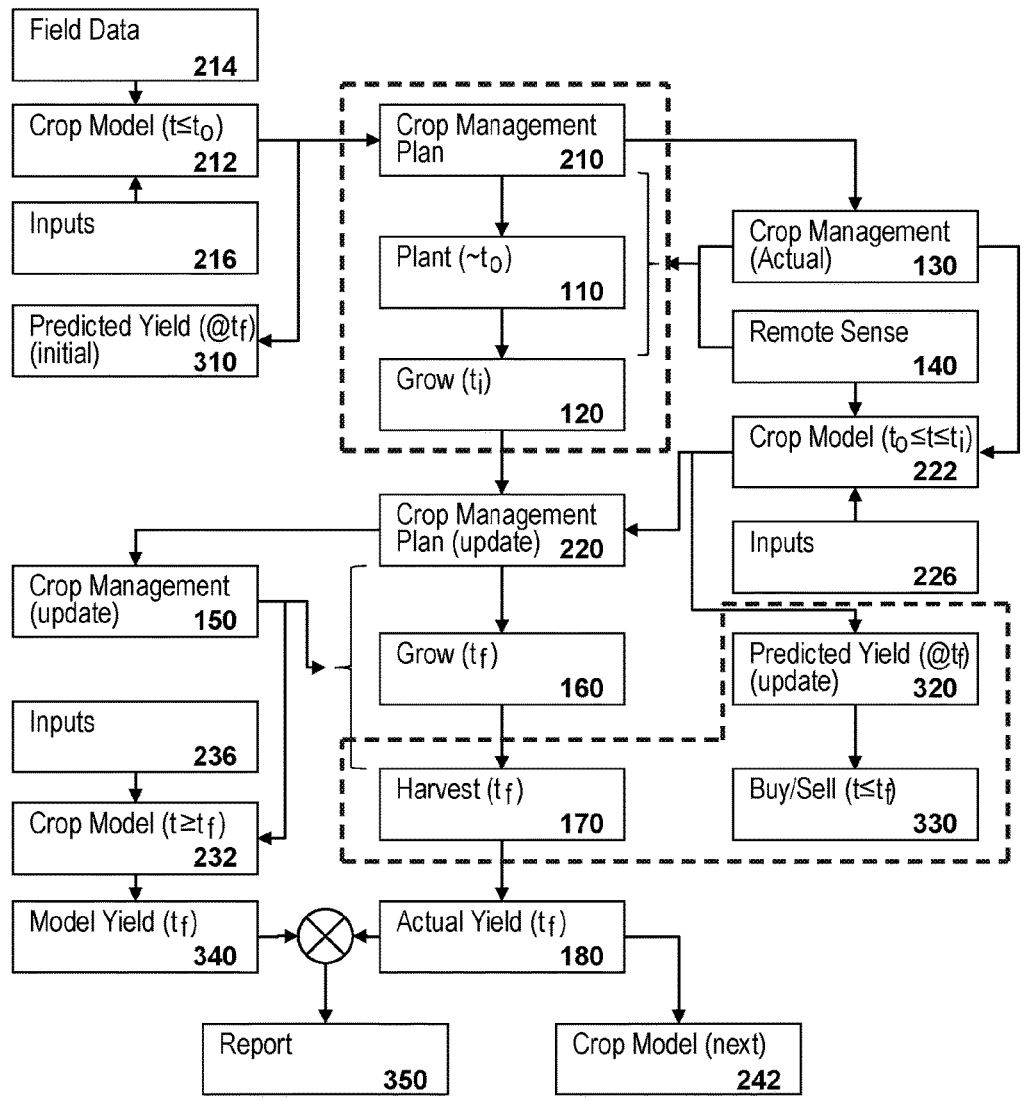
FIG. 1B is a process flow diagram illustrating methods according to the disclosure incorporating precision crop modeling, in particular a method for growing a crop plant, for example as practiced by a small-, medium-, or large-scale grower.

In another aspect, the disclosure relates to a method for growing a crop plant, for example as practiced by a small-, medium-, or large-scale grower. FIG. 1B is a process flow diagram illustrating such a method according to the disclosure incorporating precision crop modeling, in particular a method for growing a crop plant using specific steps from the general process flow diagram of FIG. 1. The illustrated method includes: (a) receiving a crop management plan for a field provided by a crop model; (b) planting a crop plant at an initial time ($t_o$) in the field according to the crop management plan; (c) growing the crop plant until an intermediate time ($t_i$) (e.g., between the initial time ($t_o$) and a planned final time ($t_f$) for harvesting the crop plant); (d) receiving a predicted crop yield for the field provided by a crop model using (i) actual weather data for the field between the initial time ($t_o$) and the intermediate time ($t_i$), and (ii) projected weather data for the field after the intermediate time ($t_i$) (e.g., between the intermediate time ($t_i$) and the planned final time ($t_f$)); (e) performing at least one of purchasing futures, selling futures, and purchasing insurance for the crop plant based on the predicted crop yield; and (f) harvesting the crop plant (e.g., at about the planned final time ($t_f$)).

Figure 1C:
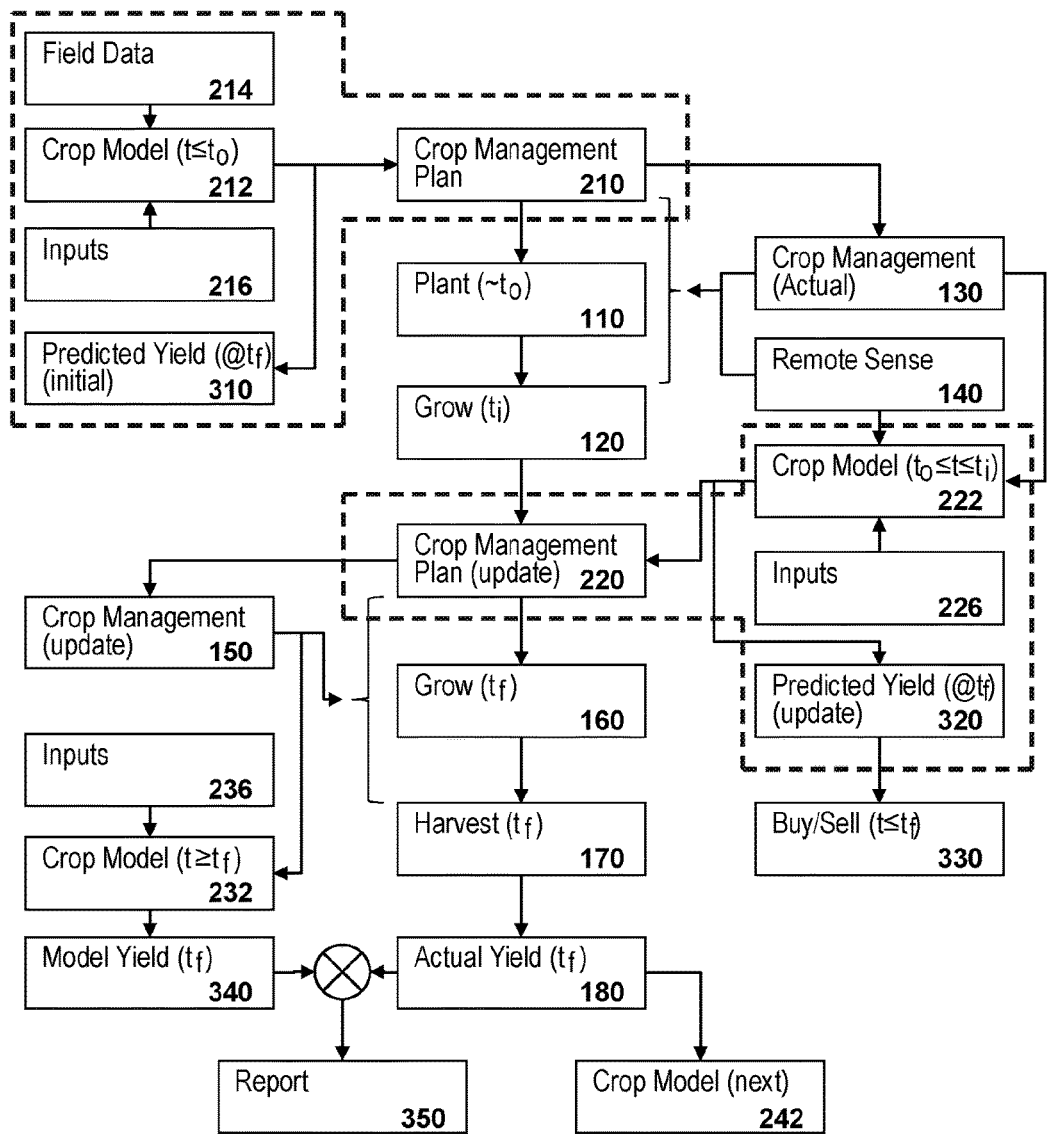
FIG. 1C is a process flow diagram illustrating methods according to the disclosure incorporating precision crop modeling, in particular a method for managing the growth of a crop plant, for example as practiced by a party performing crop modeling and providing a corresponding crop management plan to a small-, medium-, or large-scale grower.

In another aspect, the disclosure relates to a method for managing the growth of a crop plant, for example as practiced by a party performing crop modeling and providing a corresponding crop management plan to a small-, medium-, or large-scale grower. FIG. 1C is a process flow diagram illustrating such a method according to the disclosure incorporating precision crop modeling, in particular a method for managing the growth of a crop plant using specific steps from the general process flow diagram of FIG. 1. The illustrated method includes: (a) receiving historical data for a field, the historical data comprising historical weather data; (b) determining a crop management plan for a crop plant in the field using a crop model and the field historical data, the crop management plan comprising a planned initial time ($t_o$) for planting the crop plant and optionally a planned final time ($t_f$) for harvesting the crop plant; (c) providing the crop management plan directly or indirectly to a grower; (d) receiving actual weather data for the field up to an intermediate time ($t_i$) (e.g., between the initial time ($t_o$) and the final time ($t_f$)); (e) determining an updated crop management plan for the field using a crop model using (i) the actual weather data for the field between the initial time ($t_o$) and the intermediate time ($t_i$), and (ii) projected weather data for the field after the intermediate time ($t_i$) (e.g., between the intermediate time ($t_i$) and the planned final time ($t_f$)); and (f) providing the updated crop management plan directly or indirectly to the grower.

Figure 1D:
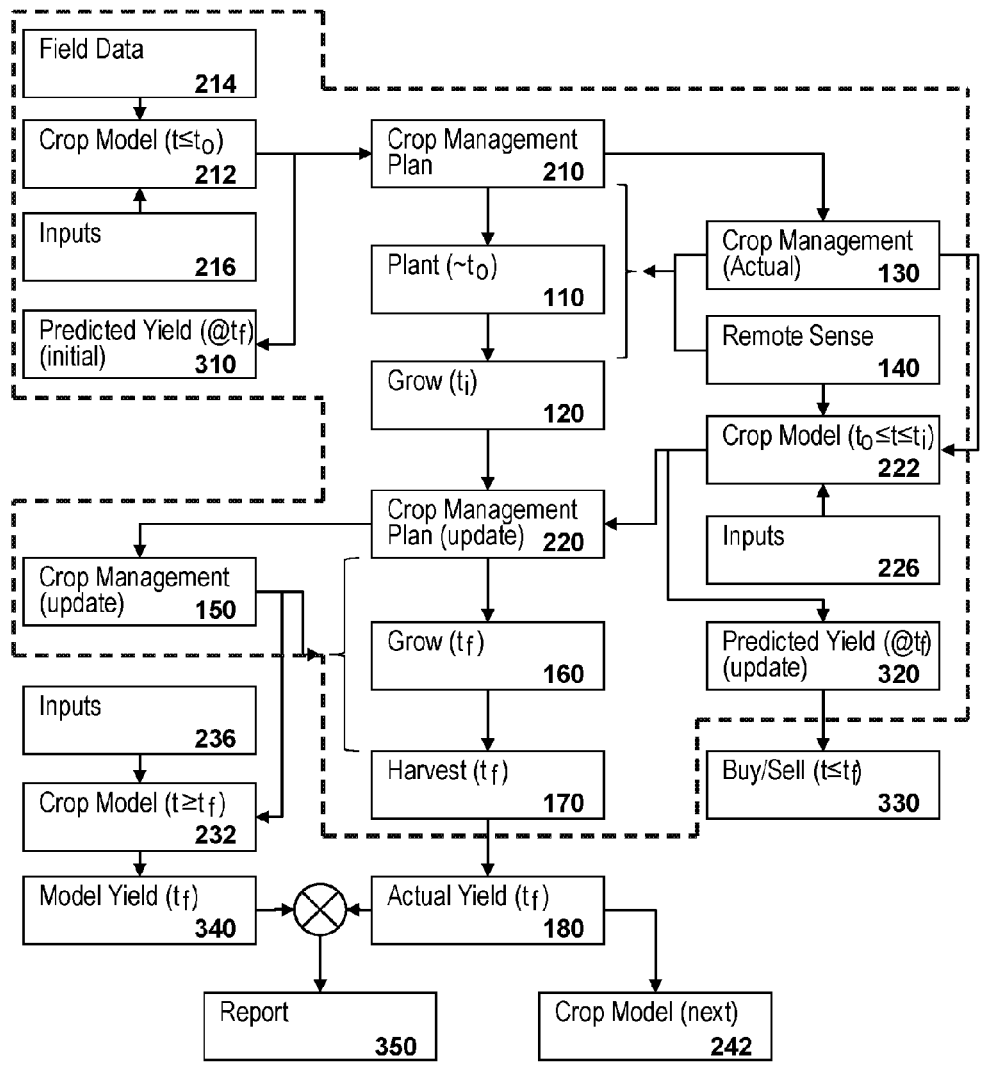
FIG. 1D is a process flow diagram illustrating methods according to the disclosure incorporating precision crop modeling, in particular a method for growing a crop plant, for example as practiced by a grower with integrated crop modeling capabilities.

In another aspect, the disclosure relates to a method for growing a crop plant, for example as practiced by a medium- or large-scale grower with integrated crop modeling capabilities. FIG. 1D is a process flow diagram illustrating such a method according to the disclosure incorporating precision crop modeling, in particular a method for growing a crop plant using specific steps from the general process flow diagram of FIG. 1. The illustrated method includes: (a) receiving historical data for a field, the historical data comprising historical weather data; (b) determining a crop management plan for a crop plant in the field using a crop model and the field historical data, the crop management plan comprising a planned initial time ($t_o$) for planting the crop plant and optionally a planned final time ($t_f$) for harvesting the crop plant; (c) planting a crop plant at about the initial time ($t_o$) in the field according to the crop management plan; (d) growing the crop plant until an intermediate time ($t_i$) (e.g., between the initial time ($t_o$) and a planned final time ($t_f$) for harvesting the crop plant); (e) receiving actual weather data for the field up to the intermediate time ($t_i$) (e.g., between the initial time ($t_o$) and the final time ($t_f$)); (f) determining an updated crop management plan for the field using a crop model using (i) the actual weather data for the field between the initial time ($t_o$) and the intermediate time ($t_i$), and (ii) projected weather data for the field after the intermediate time ($t_i$) (e.g., between the intermediate time ($t_i$) and the planned final time ($t_f$)); (g) growing the crop plant after the intermediate time ($t_i$) according to the updated crop management plan; and (g) harvesting the crop plant (e.g., at about the planned final time ($t_f$)).

Figure 1E:
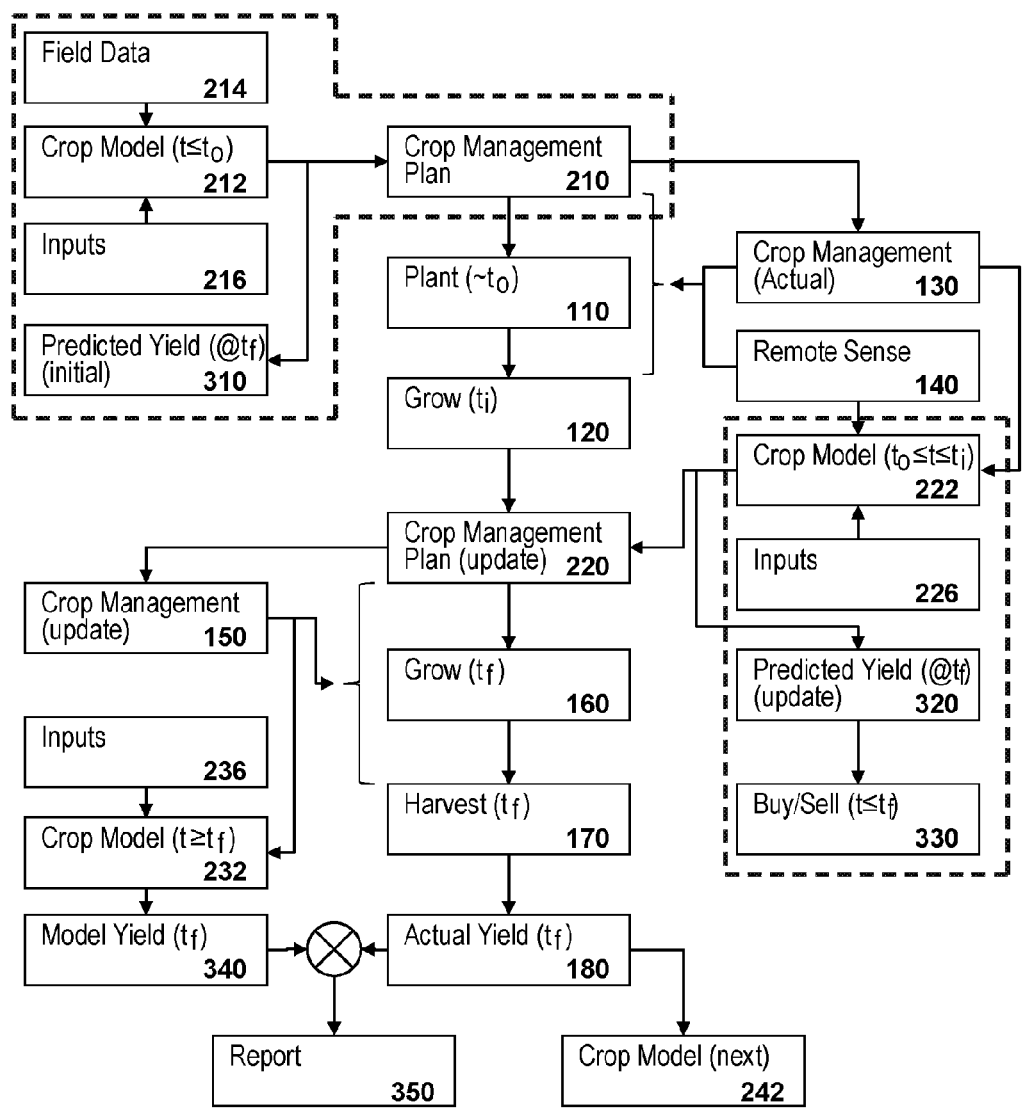
FIG. 1E is a process flow diagram illustrating methods according to the disclosure incorporating precision crop modeling, in particular a method for managing the growth of a crop plant, for example as practiced by a crop insurer and/or a party managing the aggregate growth of crops across multiple fields.

In another aspect, the disclosure relates to a method for managing the growth of a crop plant, for example as practiced by a crop insurer providing corresponding crop insurance to a small-, medium-, or large-scale grower. FIG. 1E is a process flow diagram illustrating such a method according to the disclosure incorporating precision crop modeling, in particular a method for managing the growth of a crop plant using specific steps from the general process flow diagram of FIG. 1. The illustrated method includes: (a) receiving historical data for a field, the historical data comprising historical weather data; (b) receiving a crop management plan for a crop plant in the field, the crop management plan comprising a planned initial time ($t_o$) for planting the crop plant and optionally a planned final time ($t_f$) for harvesting the crop plant; (c) determining at the initial time ($t_o$) a predicted yield for the crop plant using a crop model, the field historical data, and the crop management plan; (d) receiving actual weather data for the field up to an intermediate time ($t_i$) (e.g., between the initial time ($t_o$) and the final time ($t_f$)); (e) determining at the intermediate time ($t_i$) an updated predicted yield for the crop plant using a crop model, the actual weather data for the field between the initial time ($t_o$) and the intermediate time ($t_i$), projected weather data for the field after the intermediate time ($t_i$) (e.g., between the intermediate time ($t_i$) and the planned final time ($t_f$)), and the crop management plan; and (f) selling crop insurance for the crop plant in the field according to an insurance parameter determined using at least one of the predicted yield and the updated predicted yield.

In another aspect, the disclosure relates to a method for managing the growth of a crop plant, for example as practiced by a party managing the aggregate growth of crops across multiple fields. FIG. 1E is a process flow diagram illustrating such a method according to the disclosure incorporating precision crop modeling, in particular a method for managing the growth of a crop plant using specific steps from the general process flow diagram of FIG. 1. The illustrated method includes: (a) receiving historical data for a plurality of fields in a region, the historical data comprising historical weather data; (b) receiving a crop management plan for a crop plant in each of the plurality of fields, the crop management plan comprising a planned initial time ($t_o$) for planting the crop plant and a optionally planned final time ($t_f$) for harvesting the crop plant in each field; (c) determining at the initial time ($t_o$) a predicted yield for the crop plant using a crop model, the field historical data, and the crop management plan for each of the plurality of fields; (d) receiving actual weather data for each of the plurality of fields up to an intermediate time ($t_i$) (e.g., between the initial time ($t_o$) and the final time ($t_f$)); (e) determining at the intermediate time ($t_i$) an updated predicted yield for the crop plant using a crop model, the actual weather data for the field between the initial time ($t_o$) and the intermediate time ($t_i$), projected weather data for the field after the intermediate time ($t_i$) (e.g., between the intermediate time ($t_i$) and the planned final time ($t_f$)), and the crop management plan for each of the plurality of fields; (f) purchasing or selling futures for the crop plant according to the updated projected yield for the crop plant in the region.

Figure 3:
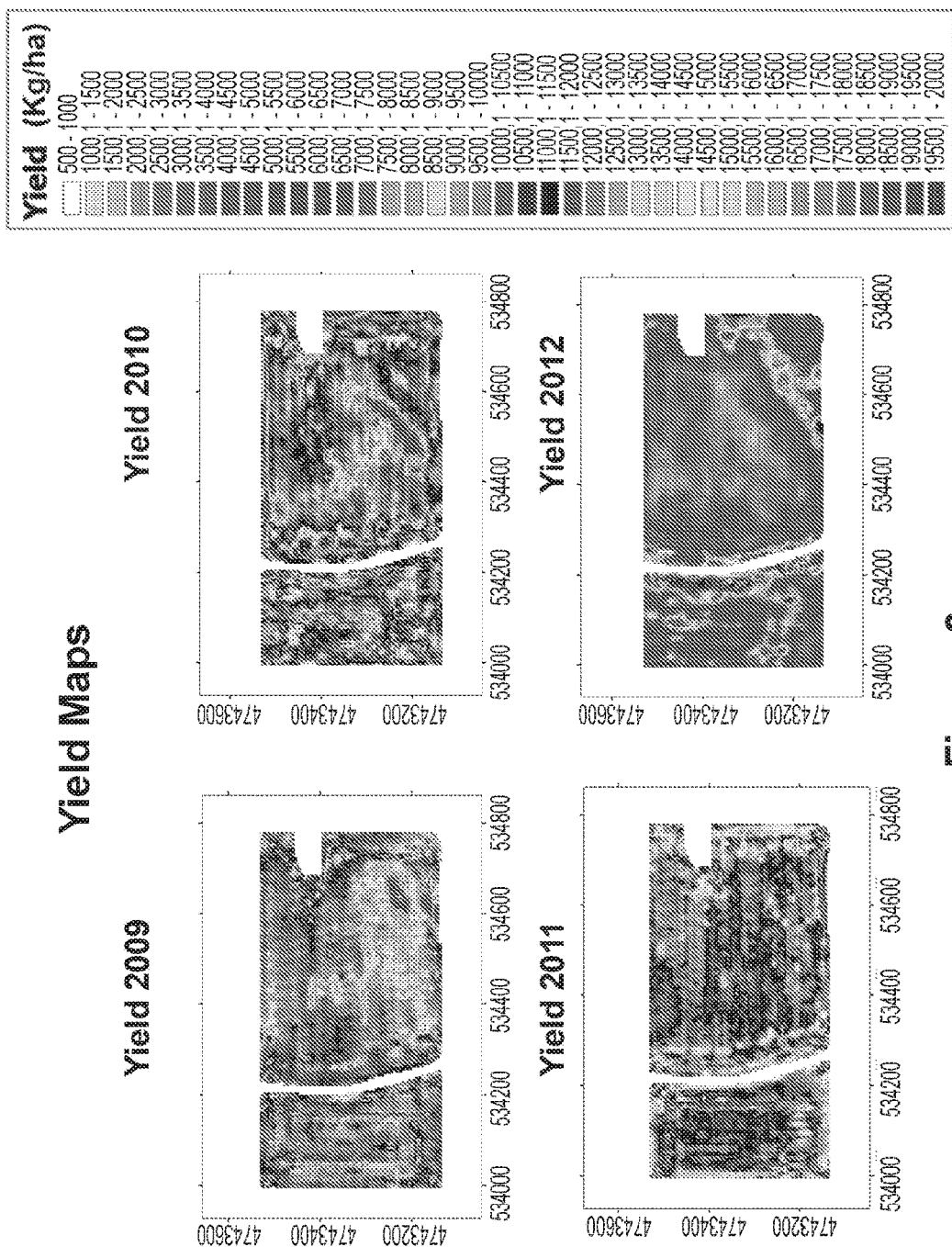
FIG. 3 includes a series of field yield maps illustrating crop yield as a function of position and time (growing season).

FIG. 3 includes a series of field yield maps illustrating a maize crop yield as a function of position (spatial yield variability across the field) and time (growing season). The yield maps illustrate the type of historical yield data that can be used in connection with historical weather data to generate a crop management plan with a crop model (e.g., representing the field data 214 used in combination with other inputs 216 to determine the crop management plan 210 with the crop model 212 as illustrated in FIG. 1), whether a SALUS crop model or otherwise. Although four years of yield data are illustrated, suitably analogous historical data spanning up to several decades (e.g., past 30 years from current growing season) is used. The historical weather data and historical yield data can be used to initialize the crop model (e.g., before determining a crop management plan for the forthcoming growing season). Accurate initialization of the field state properties increases the ability of the crop model to provide (i) an accurate initial predicted yield and (ii) an initial crop management plan which is more likely to optimize one or more crop or field parameters at harvest (e.g., crop yield or otherwise).

Initialization of the crop model for a given field ensures that the field state properties (e.g., soil physical characteristics, soil chemical constituents, and soil thermal characteristics, such as a function of location or constant across the field, depending on the particular property) determined as representing the field at a time prior to planting are as accurate as possible. Initialization includes determining field state properties at a reference time in the historical data period (e.g., at the earliest time in historical data period), which field state properties, in combination with the known historical weather data and known historical crop management activities for the same period, allow the crop model to best reproduce the known historical yield data. The initialization procedure is particularly useful to provide crop model inputs which are not easily measureable or otherwise determinable at the time just prior to planting. For example, field soil parameters (e.g., soil type or texture such as soil/silt/clay, soil depth, soil porosity, soil organic carbon such as resulting from root accumulation and decomposition, soil nutrient and other material species content) can be difficult to measure, in particular at the level of spatial resolution over which some of them vary. As an illustration, with 30 years of historical yield and weather data, any unknown soil or field properties are initialized by determining corresponding values at a reference time (e.g., 30 years prior as the beginning of the historical data period), for example via an iterative process or other conventional solution-finding algorithm, which cause the crop model to most accurately reproduce the known historical yield data (e.g., using any suitable means for error characterization and minimization) using its time-stepping calculation process to determine all field material quantities, energy quantities, and crop growth quantities at points in time spanning the historical data period. As a result of proper soil and/or field property initialization at the selected reference time, the crop model also provides the complete field state properties at the end of the historical data period, which can be selected to coincide with the beginning of the current season (e.g., and the field state properties at the end of the historical data period used for initialization provide the initial field state properties for crop model evaluation and crop management plan determination in the current season).

Figure 4A:
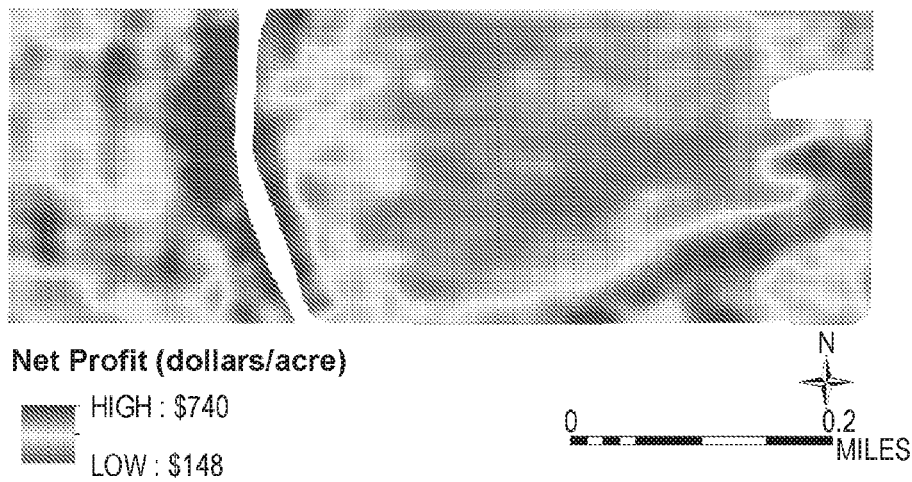
FIG. 4A is a field profit map illustrating the position-dependent profit actually realized on a given field using historical crop management practices and without input from a crop model.
Figure 4B:
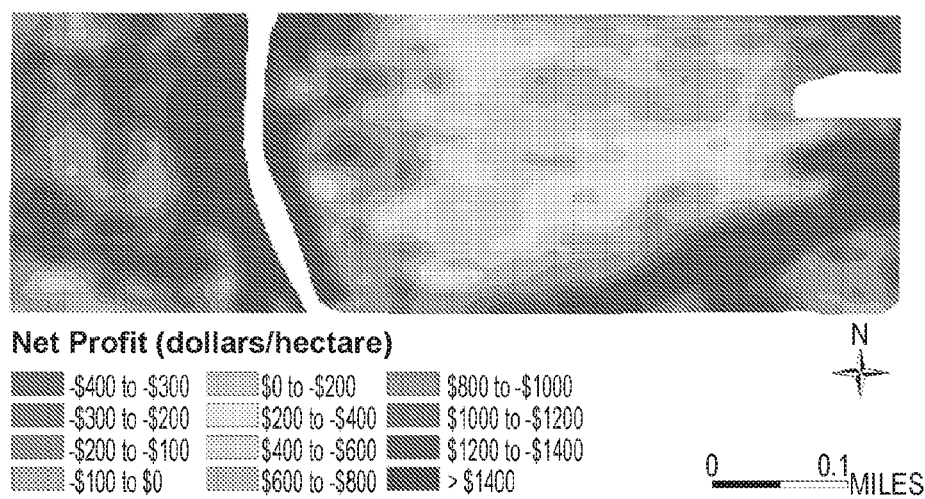
FIG. 4B is a field profit map illustrating the position-dependent profit predicted for a given field using historical weather and yield data in combination with input from a crop model (variable nitrogen fertilizer, no irrigation).
Figure 4C:
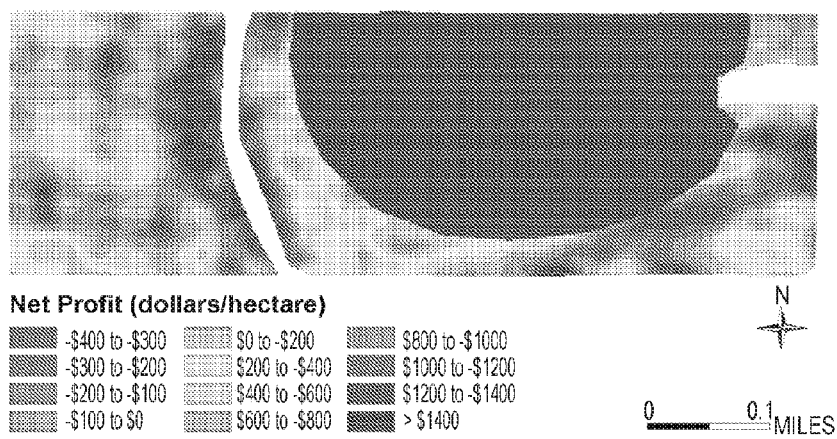
FIG. 4C is a field profit map illustrating the position-dependent profit predicted for a given field using historical weather and yield data in combination with input from a crop model (variable nitrogen fertilizer, including irrigation).

FIGS. 4A-4C illustrate the use of crop modeling techniques in combination with known weather information for the current growing season to optimize a crop growth parameter (e.g., crop plant marginal net return). FIG. 4A is a field profit map illustrating the position-dependent profit actually realized on a given field using historical crop management practices and without input from a crop model. In the actual historical planting and harvesting scenario illustrated in FIG. 4A, no crop modeling was performed and the grower simply followed conventional practice to uniformly apply nitrogen (N) fertilizer (200 kg N/ha application rate) without any supplemental field irrigation. The profit map of FIG. 4A corresponds to the yield map of FIG. 3 (for 2012), with the profit being based on crop yield, crop sale price, and field operating costs for the growing season.

FIG. 4B is a field profit map illustrating the position-dependent profit predicted for a given field using historical weather and yield data in combination with input from the SALUS crop model (variable nitrogen fertilizer, no irrigation). In this case, by using the crop model in combination with known in-season weather to determine a crop management strategy that optimizes net return, the crop model determines a reduced-fertilization level (30 lb/acre; 33.6 kg/ha) as generating a higher net return. In another refinement (not illustrated in the figure), it is also possible for the crop model to determine a location-dependent fertilization management plan (e.g., some regions receive a higher level of fertilization, while others receive less). FIG. 4C is an analogous field profit map illustrating the position-dependent profit predicted for a given field using historical weather and yield data in combination with input from a crop model (variable nitrogen fertilizer, including irrigation). FIG. 4C illustrates that net return can be increased even further relative to the actual historical result (FIG. 4A), by increasing the fertilization amount (200 lb/acre; 224 kg/ha) and irrigating the field with additional water. The crop management scenario of FIG. 4C could be desirable, for example where water is freely or inexpensively available and there are no environmental or regulatory concerns with a high level of fertilizer used (e.g., nitrogen leaching or $N_2O$ emission). Conversely, the crop management scenario of FIG. 4B could be the most desirable available option, for example where a supplemental water source is not readily available and/or the upper level of fertilizer which may be used is limited by governmental or environmental considerations, or is otherwise constrained. FIGS. 4B and 4C represent a post-growing season prediction using actual weather for the whole season. In an alternative scenario (not shown) a mid-season feedback adjustment could also have been made, prior to the second application of fertilizer (e.g., late June).

Figure 5:
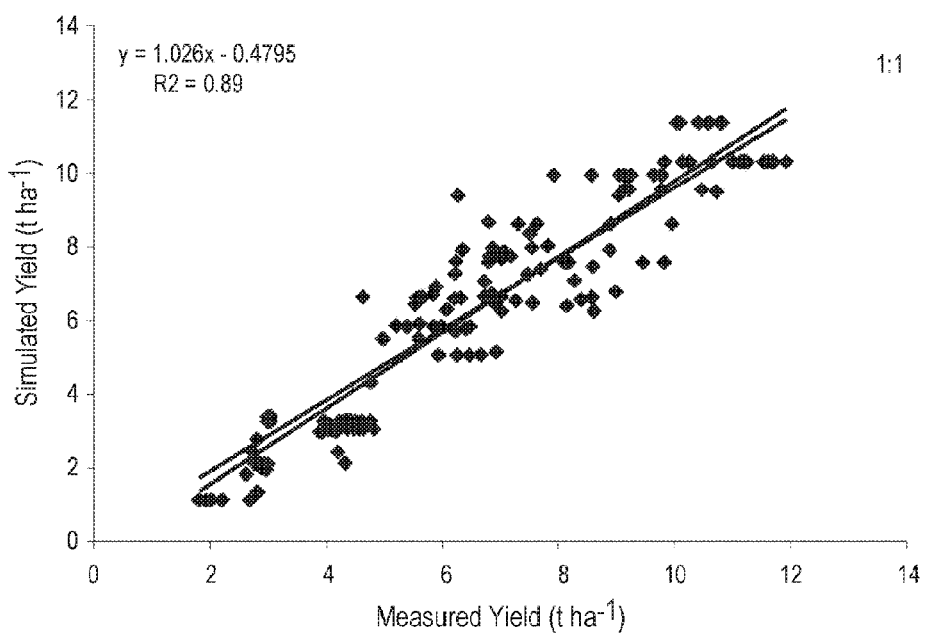
FIG. 5 is a graph illustrating crop model validation data correlating crop model-simulated yields with actual measured yields for maize, wheat, and soybean crops over a period of 5 years.

FIG. 5 is a graph illustrating SALUS crop model validation data correlating crop model-simulated yields with actual measured yields for maize, wheat, and soybean crops over a period of 5 years. All three crop types are aggregated on the graph. For the illustrated data points, growing seasons were computed with the SALUS model using known weather data for the growing season as well as known crop management activities for the growing season (e.g., dates of planting and harvest, dates and amount of fertilization, dates and amount of irrigation (if any), etc.). As shown, the data regression between the crop model-simulated yields and the actual measured yields has a slope of 1.026, which is very near to the ideal slope of 1 (i.e., indicating a 1:1 relationship between simulated and measured values). Similarly, the regression has a high correlation coefficient ($r^2$=0.89), which, combined with the regression line slope, indicates that the SALUS crop model provide an accurate representation of crop growth, in particular in combination with known weather for the modeled period.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

REFERENCES

Basso et al., "Spatial validation of crop models for precision agriculture," *Agricultural Systems*, vol. 68, p. 97-112 (2001)

Basso et al., "Analyzing the effects of climate variability on spatial pattern of yield in a maize-wheat-soybean rotation," *European Journal of Agronomy*, vol. 26, p. 82-91 (2007)

Basso et al., "Water use efficiency is not constant when crop water supply is adequate or fixed: The role of agronomic management," *European Journal of Agronomy*, vol. 28, p. 273-281 (2008)

Basso et al., "Landscape Position and Precipitation Effects on Spatial Variability of Wheat Yield and Grain Protein in Southern Italy," *Journal of Agronomy and Crop Science*, vol. 195, p. 301-312 (2009)

Basso et al., "Long-term wheat response to nitrogen in a rainfed Mediterranean environment: Field data and simulation analysis," *European Journal of Agronomy*, vol. 33, p. 132-138 (2010)

Basso et al., "Assessing the Impact of Management Strategies on Water Use Efficiency Using Soil-Plant-Atmosphere Models," *Vadose Zone J.* (2011)

Basso et al., "Economic and environmental evaluation of site-specific tillage in a maize crop in NE Italy," *European Journal of Agronomy*, vol. 35, p. 83-92 (2011)

Basso et al., "A strategic and tactical management approach to select optimal N fertilizer rates for wheat in a spatially variable field," *European Journal of Agronomy*, vol. 35, p. 215-222 (2011)

Basso et al., "Environmental and economic evaluation of N fertilizer rates in a maize crop in Italy: A spatial and temporal analysis using crop models," *Biosystems Engineering*, vol. 113, p. 103-111 (2012)

Batchelor et al., "Examples of strategies to analyze spatial and temporal yield variability using crop models," *European Journal of Agronomy*, vol. 18, p. 141-158 (2002)

Cammarano et al., "Use of the Canopy Chlorphyl Content Index (CCCI) for Remote Estimation of Wheat Nitrogen Content in Rainfed Environments," *Agronomy Journal*, vol. 103, issue 6, p. 1597-1603 (2011)

Cammarano et al., "Assessing the Robustness of Vegetation Indices to Estimate Wheat N in Mediterranean Environments," *Remote Sensing*, vol. 6, p. 2827-2844 (2014)

What is claimed is:

1. A method for growing a crop plant, the method comprising:
    (a) receiving a crop management plan for a field provided by a crop model using historical yield data for the field;
    (b) planting a crop plant at an initial time ($t_o$) in the field according to the crop management plan;
    (c) growing the crop plant until an intermediate time ($t_i$) between the initial time ($t_o$) and a planned final time ($t_f$) for harvesting the crop plant;
    (d) receiving an updated crop management plan for the field provided by a crop model using (i) actual weather data for the field between the initial time ($t_o$) and the intermediate time ($t_i$), (ii) remotely sensed crop plant nitrogen data for the field at a point in time between the initial time ($t_o$) and the intermediate time ($t_i$) as an in-season crop yield validation point for the crop model, and (iii) projected weather data for the field between the intermediate time ($t_i$) and the planned final time ($t_f$);
    (e) growing the crop plant after the intermediate time ($t_i$) according to the updated crop management plan; and
    (f) harvesting the crop plant at about the planned final time ($t_f$).

2. The method of claim 1, wherein the crop plant is selected from the group consisting of corn, wheat, soybean, cultivars thereof, and combinations thereof.

3. The method of claim 1, wherein the crop management plan is provided by the crop model using historical weather data for the field.

4. The method of claim 1, wherein part (c) comprises growing the crop plant according to the crop management plan.

5. The method of claim 1, wherein the actual weather data and the projected weather data comprise one or more of incident solar radiation, maximum and minimum temperature, and rainfall.

6. The method of claim 1, wherein the projected weather data in part (d) is selected from the group consisting of forecast data for the field, probabilistic weather data based on historical weather data for the field, and combinations thereof.

7. The method of claim 1, wherein the updated crop management plan is provided by the crop model additionally using the actual crop management plan performed for the field between the initial time ($t_o$) and the intermediate time ($t_i$).

8. The method of claim 1, wherein:
using the remotely sensed crop plant nitrogen data as an in-season crop yield validation point for the crop model further comprises refining future crop model output with updated field state properties based on the crop yield validation point; and
the remotely sensed crop plant nitrogen corresponds to an optical measurement of one or more plant indices.

9. The method of claim 1, wherein part (e) comprises growing the crop plant according to the updated crop management plan until a new updated crop management plan is received at a new intermediate time ($t_i^{NEW}$) or the crop plant is harvested.

10. The method of claim 1, comprising performing parts (c)-(e) repeatedly to provide a plurality of updated crop management plans at a plurality of intermediate times ($t_i^{(j)}$).

11. The method of claim 1, wherein the crop management plan for the field provided by the crop model optimizes one or more of crop plant yield, crop plant quality, crop plant marginal net return, soil organic content, and environmental pollutant generation.

12. The method of claim 1, wherein the crop management plan comprises one or more of crop plant species, crop plant cultivar, tilling plan, pest management schedule, pest management chemicals, irrigation amount, irrigation schedule, fertilization amount, fertilization type, fertilization schedule, planting time, and harvest time.

13. The method of claim 1, wherein the crop management plan is spatially variable for the field.

14. The method of claim 1, wherein the updated crop management plan for the field provided by the crop model optimizes one or more of crop plant yield, crop plant marginal net return, soil organic content, and environmental pollutant generation.

15. The method of claim 1, wherein the updated crop management plan comprises one or more of pest management schedule, pest management chemicals, irrigation amount, irrigation schedule, fertilization amount, fertilization type, fertilization schedule, and harvest time.

16. The method of claim 1, wherein the updated crop management plan is spatially variable for the field.

17. The method of claim 1, wherein at least one crop management item is different in the updated crop management plan in part (d) relative to the corresponding crop management item from the crop management plan in part (a).

18. The method of claim 1, wherein:
(i) the crop management plan in part (a) comprises at least one of a fertilization amount, a fertilization type, a fertilization location, and a fertilization schedule; and (ii) the updated crop management plan in part (d) comprises at least one of an updated fertilization amount, an updated fertilization type, an updated fertilization location, and, an updated fertilization schedule relative to the crop management plan in part (a).

19. The method of claim 1, wherein:
(i) the crop management plan in part (a) comprises at least one of an irrigation amount and an irrigation schedule; and
(ii) the updated crop management plan in part (d) comprises at least one of an updated irrigation amount and an updated irrigation schedule relative to the crop management plan in part (a).

20. The method of claim 1, wherein:
the crop plant is selected from the group consisting of corn, wheat, soybean, cultivars thereof, and combinations thereof; and
the crop management plan is provided by the crop model using historical weather data for the field.

21. The method of claim 1, wherein:
the crop management plan for the field provided by the crop model optimizes one or more of crop plant yield, crop plant quality, crop plant marginal net return, soil organic content, and environmental pollutant generation;
the crop management plan comprises one or more of crop plant species, crop plant cultivar, tilling plan, pest management schedule, pest management chemicals, irrigation amount, irrigation schedule, fertilization amount, fertilization type, fertilization schedule, planting time, and harvest time;
the crop management plan is spatially variable for the field;
the updated crop management plan for the field provided by the crop model optimizes one or more of crop plant yield, crop plant marginal net return, soil organic content, and environmental pollutant generation;
the updated crop management plan comprises one or more of pest management schedule, pest management chemicals, irrigation amount, irrigation schedule, fertilization amount, fertilization type, fertilization schedule, and harvest time;
the updated crop management plan is spatially variable for the field; and
at least one crop management item is different in the updated crop management plan in part (d) relative to the corresponding crop management item from the crop management plan in part (a).

22. The method of claim 1, wherein:
(i) the crop management plan in part (a) comprises a fertilization amount; and
(ii) the updated crop management plan in part (d) comprises an updated fertilization amount relative to the crop management plan in part (a).

23. A method for growing a crop plant, the method comprising:
(a) receiving a crop management plan for a field provided by a crop model using historical yield data for the field;
(b) planting a crop plant at an initial time ($t_o$) in the field according to the crop management plan;
(c) growing the crop plant until an intermediate time ($t_i$) between the initial time ($t_o$) and a planned final time ($t_f$) for harvesting the crop plant;
(d) receiving a predicted crop yield for the field provided by a crop model using (i) actual weather data for the field between the initial time ($t_o$) and the intermediate time ($t_i$), (ii) remotely sensed crop plant nitrogen data for the field at a point in time between the initial time ($t_o$) and the intermediate time ($t_i$) as an in-season crop yield validation point for the crop model, and (iii) projected weather data for the field between the intermediate time ($t_i$) and the planned final time ($t_f$);

(e) performing at least one of purchasing futures, selling futures, and purchasing insurance for the crop plant based on the predicted crop yield; and (f) harvesting the crop plant at about the planned final time ($t_f$).

24. The method of claim 23, wherein:
the crop plant is selected from the group consisting of corn, wheat, soybean, cultivars thereof, and combinations thereof; and
the crop management plan is provided by the crop model using historical weather data for the field.

25. The method of claim 23, wherein:
using the remotely sensed crop plant nitrogen data as an in-season crop yield validation point for the crop model further comprises refining future crop model output with updated field state properties based on the crop yield validation point; and
the remotely sensed crop plant nitrogen corresponds to an optical measurement of one or more plant indices.

26. The method of claim 23, wherein:
the crop management plan for the field provided by the crop model optimizes one or more of crop plant yield, crop plant quality, crop plant marginal net return, soil organic content, and environmental pollutant generation;
the crop management plan comprises one or more of crop plant species, crop plant cultivar, tilling plan, pest management schedule, pest management chemicals, irrigation amount, irrigation schedule, fertilization amount, fertilization type, fertilization schedule, planting time, and harvest time; and
the crop management plan is spatially variable for the field.

27. A method for growing a crop plant, the method comprising:
(a) receiving historical data for a field, the historical data comprising historical weather data and historical yield data for the field;
(b) determining a crop management plan for a crop plant in the field using a crop model and the field historical data, the crop management plan comprising a planned initial time ($t_o$) for planting the crop plant and a planned final time ($t_f$) for harvesting the crop plant;
(c) planting a crop plant at about the initial time ($t_o$) in the field according to the crop management plan;
(d) growing the crop plant until an intermediate time ($t_i$) between the initial time ($t_o$) and a planned final time ($t_f$) for harvesting the crop plant;
(e) receiving actual weather data for the field up to the intermediate time ($t_i$) between the initial time ($t_o$) and the final time ($t_f$);
(f) determining an updated crop management plan for the field using a crop model using (i) the actual weather data for the field between the initial time ($t_o$) and the intermediate time ($t_i$), (ii) remotely sensed crop plant nitrogen data for the field at a point in time between the initial time ($t_o$) and the intermediate time ($t_i$) as an in-season crop yield validation point for the crop model, and (iii) projected weather data for the field between the intermediate time ($t_i$) and the planned final time ($t_f$);
(g) growing the crop plant after the intermediate time ($t_i$) according to the updated crop management plan; and
(h) harvesting the crop plant at about the planned final time ($t_f$).

28. The method of claim 27, wherein:
using the remotely sensed crop plant nitrogen data as an in-season crop yield validation point for the crop model further comprises refining future crop model output with updated field state properties based on the crop yield validation point; and
the remotely sensed crop plant nitrogen corresponds to an optical measurement of one or more plant indices.

29. The method of claim 27, wherein:
the crop plant is selected from the group consisting of corn, wheat, soybean, cultivars thereof, and combinations thereof;
the crop management plan for the field provided by the crop model optimizes one or more of crop plant yield, crop plant quality, crop plant marginal net return, soil organic content, and environmental pollutant generation;
the crop management plan comprises one or more of crop plant species, crop plant cultivar, tilling plan, pest management schedule, pest management chemicals, irrigation amount, irrigation schedule, fertilization amount, fertilization type, fertilization schedule, planting time, and harvest time;
the crop management plan is spatially variable for the field;
the updated crop management plan for the field provided by the crop model optimizes one or more of crop plant yield, crop plant marginal net return, soil organic content, and environmental pollutant generation;
the updated crop management plan comprises one or more of pest management schedule, pest management chemicals, irrigation amount, irrigation schedule, fertilization amount, fertilization type, fertilization schedule, and harvest time;
the updated crop management plan is spatially variable for the field; and
at least one crop management item is different in the updated crop management plan in part (f) relative to the corresponding crop management item from the crop management plan in part (a).

30. The method of claim 27, wherein:
(i) the crop management plan in part (a) comprises at least one of a fertilization amount, a fertilization type, a fertilization location, and a fertilization schedule; and
(ii) the updated crop management plan in part (f) comprises at least one of an updated fertilization amount, an updated fertilization type, an updated fertilization location, and, an updated fertilization schedule relative to the crop management plan in part (a).

31. The method of claim 27, wherein:
(i) the crop management plan in part (a) comprises a fertilization amount; and
(ii) the updated crop management plan in part (f) comprises an updated fertilization amount relative to the crop management plan in part (a).

* * * * *